US012493799B2

(12) United States Patent
Kudo

(10) Patent No.: US 12,493,799 B2
(45) Date of Patent: Dec. 9, 2025

(54) LEARNING APPARATUS, METHOD, AND PROGRAM, IMAGE GENERATION APPARATUS, METHOD, AND PROGRAM, TRAINED MODEL, VIRTUAL IMAGE, AND RECORDING MEDIUM

(71) Applicant: FUJIFILM Corporation, Tokyo (JP)

(72) Inventor: Akira Kudo, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 379 days.

(21) Appl. No.: 18/183,954

(22) Filed: Mar. 15, 2023

(65) Prior Publication Data

US 2023/0214664 A1 Jul. 6, 2023

Related U.S. Application Data

(63) Continuation of application No. PCT/JP2021/018614, filed on May 17, 2021.

(30) Foreign Application Priority Data

Sep. 28, 2020 (JP) ................................. 2020-162674

(51) Int. Cl.
*G06N 3/094* (2023.01)
*G16H 30/00* (2018.01)

(52) U.S. Cl.
CPC ............ *G06N 3/094* (2023.01); *G16H 30/00* (2018.01)

(58) Field of Classification Search
CPC ........ A61B 6/03; G06N 3/045; G06N 3/0464; G06N 3/0475; G06N 3/09; G06N 3/094;

(Continued)

(56) References Cited

U.S. PATENT DOCUMENTS 10,783,875 B2 * 9/2020 Hosseini-Asl .......... G10L 15/16
11,003,995 B2 * 5/2021 Rezagholizadeh ...... G06N 3/08
(Continued)

FOREIGN PATENT DOCUMENTS

JP   2020038410    3/2020
JP   2020047266    3/2020
(Continued)

OTHER PUBLICATIONS

Hoo-Chang Shin et al., "Medical Image Synthesis for Data Augmentation and Anonymization Using Generative Adversarial Networks," Sep. 12, 2018, Simulation and Synthesis in Medical Imaging. Sashimi 2018. Lecture Notes in Computer Science(), vol. 11037. Springer, Cham. https://doi.org/10.1007/978-3-03,pp. 1-9.*

(Continued)

*Primary Examiner* — Omar S Ismail
(74) *Attorney, Agent, or Firm* — JCIPRNET

(57) ABSTRACT

A processor inputs a first training image having a first feature to a generator, which is a generative model and generates a training virtual image having a second feature. The processor derives a plurality of types of conversion training images with different observation conditions by performing a plurality of types of observation condition conversion processing on a second training image. The processor derives a plurality of types of conversion training virtual images with the different observation conditions by performing the plurality of types of observation condition conversion processing on the training virtual image. The processor trains the generative model using evaluation results regarding the plurality of types of conversion training images and the plurality of types of conversion training virtual images.

18 Claims, 17 Drawing Sheets

(58) Field of Classification Search
CPC . G06T 1/00; G06T 7/00; G16H 30/00; G16H 30/40; G16H 50/20; G16H 50/70
See application file for complete search history.

(56) References Cited

U.S. PATENT DOCUMENTS

| | | |
|---|---|---|
| 2019/0049540 A1* | 2/2019 | Odry ................... G01R 33/543 |
| 2019/0057521 A1* | 2/2019 | Teixeira ................. G06N 3/045 |
| 2019/0286938 A1* | 9/2019 | Backhus ............... G06F 18/214 |
| 2019/0371450 A1* | 12/2019 | Lou ......................... A61N 5/103 |
| 2020/0012896 A1 | 1/2020 | Yoo et al. |
| 2020/0069973 A1* | 3/2020 | Lou ......................... G16H 30/20 |
| 2020/0074674 A1 | 3/2020 | Guo et al. |
| 2020/0126584 A1* | 4/2020 | Huang .................... G10L 21/10 |
| 2020/0184269 A1 | 6/2020 | Sakai et al. |
| 2020/0250794 A1 | 8/2020 | Zimmer et al. |
| 2020/0387698 A1* | 12/2020 | Yi ........................... G06N 3/084 |
| 2020/0411167 A1* | 12/2020 | Kearney .................... G06T 7/77 |
| 2021/0089845 A1* | 3/2021 | Galeev .................... G06N 3/045 |
| 2021/0195128 A1 | 6/2021 | Hanada |
| 2021/0244971 A1* | 8/2021 | Hibbard ................ G06T 7/0012 |
| 2022/0026699 A1* | 1/2022 | Jackson ............. G01N 21/6458 |
| 2022/0083807 A1* | 3/2022 | Zhang .................... G06N 3/084 |
| 2022/0088410 A1* | 3/2022 | Hibbard ............... A61N 5/1038 |
| 2022/0122305 A1* | 4/2022 | Smith ...................... G06N 3/08 |

FOREIGN PATENT DOCUMENTS

| | | | |
|---|---|---|---|
| JP | 2020095364 | 6/2020 | |
| JP | 2020140346 | 9/2020 | |
| RU | 2735148 C1 * | 10/2020 | ............ G06N 20/00 |
| WO | 2019025298 | 2/2019 | |

OTHER PUBLICATIONS

Mengchen Liu et al.,"Analyzing the Training Processes of Deep Generative Models,"Oct. 1, 2017, IEEE Transactions on Visualization and Computer Graphics, vol. 24, No. 1, Jan. 2018,pp. 77-84.*

Nematollah K. Batmanghelich et al.,"Generative-Discriminative Basis Learning for Medical Imaging," 30 the Dec. 2011, IEEE Transactions on Medical Imaging, vol. 31, No. 1, Jan. 2012, pp. 51-63.*

Jiayi Ma et al.,"DDcGAN: A Dual-Discriminator Conditional Generative Adversarial Network for Multi-Resolution Image Fusion,"Mar. 12, 2020, IEEE Transactions on Image Processing, vol. 29, 2020,pp. 4980-4991.*

Michael T. McCann et al.,"Convolutional Neural Networks for Inverse Problems in Imaging," Nov. 13, 2017, IEEE Signal Processing Magazine, Nov. 2017, pp. 82-93.*

Dong Yu Oh et al.,"Learning Bone Suppression from Dual Energy Chest X-rays using Adversarial Networks," Nov. 5, 2018, arXiv:1811.02628v1, pp. 1-14.*

Xin Yi et al.,"Sharpness-Aware Low-Dose CT Denoising Using Conditional Generative Adversarial Network," Feb. 20, 2018, Journal of Digital Imaging (2018) 31,pp. 664-667.*

"Office Action of Japan Counterpart Application", issued on May 28, 2024, with English translation thereof, pp. 1-8.

"Office Action of Japan Counterpart Application", issued on Oct. 29, 2024, with English translation thereof, p. 1-p. 5.

Ian J. Goodfellow et al., "Generative Adversarial Nets", Jun. 10, 2014, retrieved from arXiv database, arXiv:1406.2661v1 [stat.ML], pp. 1-9.

Phillip Isola et al., "Image-to-Image Translation with Conditional Adversarial Networks", Nov. 26, 2018, retrieved from arXiv database, arXiv:1611.07004v3 [cs.CV], pp. 1-17.

Mehdi Mirza et al., "Conditional Generative Adversarial Nets", Nov. 6, 2014, retrieved from arXiv database, arXiv:1411.1784v1 [cs.LG], pp. 1-7.

Jun-Yan Zhu et al., "Unpaired Image-to-Image Translation using Cycle-Consistent Adversarial Networks", Aug. 24, 2020, retrieved from arXiv database, arXiv:1703.10593v7 [cs.CV], pp. 1-18.

Michael T. Mccann et al., "A Review of Convolutional Neural Networks for Inverse Problems in Imaging", Oct. 11, 2017, retrieved from arXiv database, arXiv:1710.04011v1 [eess.IV], pp. 1-11.

Xin Yi et al., "Sharpness-aware Low dose CT denoising using conditional generative adversarial network", Oct. 19, 2017, retrieved from arXiv database, arXiv:1708.06453v2 [cs.CV], pp. 1-25.

Dong Yul Oh et al., "Learning Bone Suppression from Dual Energy Chest X-rays using Adversarial Networks", Nov. 5, 2018, retrieved from arXiv database, arXiv:1811.02628v1 [cs.CV], pp. 1-17.

Changhee Han et al., "Synthesizing Diverse Lung Nodules Wherever Massively: 3D Multi-Conditional GAN-based CT Image Augmentation for Object Detection", Aug. 12, 2019, retrieved from arXiv database, arXiv:1906.04962v2 [cs.CV], pp. 1-9.

Jelmer M. Wolterink et al., "Deep MR to CT Synthesis using Unpaired Data", Aug. 3, 2017, retrieved from arXiv database, arXiv:1708.01155v1 [cs.CV], pp. 1-10.

"International Search Report (Form PCT/ISA/210) of PCT/JP2021/018614", mailed on Jul. 6, 2021, with English translation thereof, pp. 1-5.

"Written Opinion of the International Searching Authority (Form PCT/ISA/237) of PCT/ JP2021/018614", mailed on Jul. 6, 2021, with English translation thereof, pp. 1-8.

* cited by examiner

|  | WL | WW |
|---|---|---|
| MEDIASTINUM CONDITION | 20 TO 60 | 300 TO 400 |
| LUNG FIELD CONDITION | −700 TO −550 | 1000 TO 1500 |
| OBSERVATION CONDITION OF BRAIN | 20 TO 60 | 60 TO 120 |

LEARNING APPARATUS, METHOD, AND PROGRAM, IMAGE GENERATION APPARATUS, METHOD, AND PROGRAM, TRAINED MODEL, VIRTUAL IMAGE, AND RECORDING MEDIUM

CROSS-REFERENCE TO RELATED APPLICATIONS

The present application is a Continuation of PCT International Application No. PCT/JP2021/018614, filed on May 17, 2021, which claims priority to Japanese Patent Application No. 2020-162674, filed on Sep. 28, 2020. Each application above is hereby expressly incorporated by reference, in its entirety, into the present application.

BACKGROUND

Technical field

The present disclosure relates to a learning apparatus, method, and program, an image generation apparatus, method, and program, a trained model, a virtual image, and a recording medium.

Related Art

Generative adversarial networks (GANs) have been proposed that alternately train a "generator" that generates data and a "discriminator" that identifies data. For example, Ian J. Goodfellow, Jean Pouget-Abadie, Mehdi Mirza, Bing Xu, David Warde-Farley, Sherjil Ozair, Aaron Courville, Yoshua Bengio, "Generative Adversarial Networks", arXiv: 1406.2661, describes research on GANs. According to a GAN, it is possible to train a generative model that generates highly accurate data in line with the feature of training data. In addition, JP2020-038410A describes a technique for performing classification, object detection, face detection, and image generation using a GAN.

In addition, research is being conducted on techniques to which GANs are applied. Phillip Isola, Jun-Yan Zhu, Tinghui Zhou, Alexei A. Efros, "Image-to-Image Translation with Conditional Adversarial Networks", CVPR2016, describes a method of learning pairs of input and output images using a GAN. According to the method described in Phillip Isola et al., it is possible to train a generative model with a lower burden of parameter adjustment.

GAN image generation has a problem in that learning is difficult in a case where there is diversity in the input data. For example, in a medical image, in a case where the parts and slice conditions of the input image are diverse, the features of the generated image are averaged. The feature of the training data is also averaged in dealing with various input data in Phillip Isola et al.

On the other hand, Mehdi Mirza, Simon Osindero, "Conditional Generative Adversarial Nets", arXiv: 1411.1784 describes a method of using data category information for GAN training. According to the method described in Mehdi Mirza et al., generative models can be adjusted based on category information.

On the other hand, in the medical field, advances in various modalities, such as computed tomography (CT) apparatuses and magnetic resonance imaging (MM) apparatuses, have enabled image diagnosis using medical images with higher quality.

A signal value (CT value) of each pixel in a CT image is a numerical representation of the X-ray absorption rate of the human body. Specifically, the CT value is predetermined to be 0 for water and −1000 for air (in units of HU). In addition, since the CT value has a very wide range of possible values such as −1000 to 4000, it is difficult to display all parts included in the CT image in an easy-to-see manner. Therefore, in a case of displaying a CT image, observation conditions of the image are set so that a specific part can be easily seen, and the density and contrast of the CT image are converted according to the set observation conditions. A window level (WL) and a window width (WW) are used as observation conditions in the case of displaying a CT image. WL is a CT value that is the center of the part to be observed in the gradation displayable by a display in a case where the CT image is displayed on the display. WW is a width between a lower limit value and an upper limit value of the CT value of the part to be observed. As such observation conditions, there are known observation conditions according to parts, such as a mediastinum condition that facilitates observation of a bone, a lung field condition that facilitates observation of lung fields, and a brain condition that facilitates observation of a brain. In addition to CT images, other medical images such as MM images and radiation images acquired by simple radiography are also displayed under observation conditions that facilitate observation of specific parts.

Various tasks have also been proposed to generate virtual images by converting medical images using the GANs described above. For example, a task of converting the resolution of a medical image to a high resolution, a task of emphasizing or attenuating a specific signal component, a task of removing artifacts, and the like have been proposed.

Here, in a case of displaying a CT image, various observation conditions are set as described above, and the CT image is converted and displayed so as to have density and contrast according to the set observation conditions. In a case where a virtual image is generated using a GAN with such CT images under various observation conditions as input images, a natural virtual image is generated for a CT image under a specific observation condition, but a generated virtual image may become unnatural in a case where the observation conditions are different. For example, a CT image with a WW narrower than the WW under a specific observation condition has a higher contrast than a CT image under a specific observation condition. As a result, the boundaries of the structures included in the CT image become unnatural and noise is conspicuous. Such a phenomenon occurs not only in medical images but also in photographic images obtained by optically imaging a subject with a camera.

Therefore, in the method described in Mehdi Mirza et al., it is conceivable to use the observation conditions of the input image as the category information. However, the GAN configuration described in Mehdi Mirza et al. has a problem in that category information has to be input to the generator, which requires significant modification to the network architecture and complicates the interface of the generator.

SUMMARY OF THE INVENTION

The present disclosure has been made in view of the above circumstances, and an object thereof is to enable generation of natural images under actually assumed observation conditions of an image without making significant modification to the network architecture.

A learning apparatus according to an aspect of the present disclosure is a learning apparatus that trains a generative model for generating a virtual image having a second feature different from a first feature from an input image having the first feature, the learning apparatus comprising at least one processor, in which the processor is configured to acquire a first training image having the first feature and a second training image having the second feature, generate a training virtual image having the second feature by inputting the first training image having the first feature to a generator, which is the generative model, derive a plurality of types of conversion training images with different observation conditions by performing a plurality of types of observation condition conversion processing on the second training image, derive a plurality of types of conversion training virtual images with the different observation conditions by performing the plurality of types of observation condition conversion processing on the training virtual image, and train the generative model using evaluation results regarding the plurality of types of conversion training images and the plurality of types of conversion training virtual images.

Examples of differences between the first feature and the second feature include a difference in image quality of the images, a presence or absence of included structures, and the like. Examples of differences in image quality include a difference in resolution, a presence or absence of noise, a difference in the degree of emphasis of specific signal components, a difference in expression formats, and the like.

In the learning apparatus according to the aspect of the present disclosure, the generative model may include a discriminator that outputs a discrimination result as to whether each of the plurality of types of conversion training images and the plurality of types of conversion training virtual images is a real image or a virtual image generated by the generator, and the processor may be configured to train the generative model using the discrimination result from the discriminator as the evaluation result.

Further, in the learning apparatus according to the aspect of the present disclosure, the generative model may include a discriminator that outputs a discrimination result as to whether each of the plurality of types of conversion training images and the plurality of types of conversion training virtual images is a real image or a virtual image generated by the generator, and the processor may be configured to derive a difference between the conversion training image and the conversion training virtual image that have been subjected to the same type of observation condition processing, and train the generative model using the discrimination result from the discriminator and the difference as the evaluation result.

Further, in the learning apparatus according to the aspect of the present disclosure, in a case where the training image is a medical image, the processor may be configured to further input part information indicating a part of a subject included in the training image to the discriminator, and the discriminator may output the discrimination result reflecting the part information.

Further, in the learning apparatus according to the aspect of the present disclosure, the processor may be configured to derive a difference between the conversion training image and the conversion training virtual image that have been subjected to the same type of observation condition processing, and train the generative model using the difference as the evaluation result.

Further, in the learning apparatus according to the aspect of the present disclosure, the processor may be configured to normalize the first training image, generate a normalized training virtual image by inputting the normalized first training image to the generator, derive the plurality of types of conversion training images by performing a plurality of types of scale conversion processing on the second training image as the plurality of types of observation condition conversion processing, and inversely normalize the training virtual image to derive the plurality of types of conversion training virtual images by performing the plurality of types of scale conversion processing on the inverse-normalized training virtual image.

Further, in the learning apparatus according to the aspect of the present disclosure, the first training image and the second training image may have the same image content.

The "same image content" means that the images include the same parts of the same subject and the body postures included in the images are the same.

A generative model according to an aspect of the present disclosure is a generative model trained by the learning apparatus according to the aspect of the present disclosure.

An image generation apparatus according to an aspect of the present disclosure comprises at least one processor, and the generative model according to the aspect of the present disclosure, and the processor is configured to generate a virtual image having a second feature by inputting an image having a first feature to the generative model.

A virtual image according to an aspect of the present disclosure is a virtual image generated by the image generation apparatus according to the aspect of the present disclosure.

A recording medium according to an aspect of the present disclosure is a recording medium on which the virtual image according to the aspect of the present disclosure is recorded.

A learning apparatus according to another aspect of the present disclosure comprises at least one processor, in which the processor is configured to acquire a virtual image generated by the image generation apparatus according to the aspect of the present disclosure, and construct a trained model by performing machine learning using the virtual image as supervised training data.

A learning method according to an aspect of the present disclosure is a learning method of training a generative model for generating a virtual image having a second feature different from a first feature from an input image having the first feature, the learning method comprising acquiring a first training image having the first feature and a second training image having the second feature, generating a training virtual image having the second feature by inputting the first training image having the first feature to a generator, which is the generative model, deriving a plurality of types of conversion training images with different observation conditions by performing a plurality of types of observation condition conversion processing on the second training image, deriving a plurality of types of conversion training virtual images with the different observation conditions by performing the plurality of types of observation condition conversion processing on the training virtual image, and training the generative model using evaluation results regarding the plurality of types of conversion training images and the plurality of types of conversion training virtual images.

An image generation method of an aspect of the present disclosure comprises generating a virtual image having a second feature by inputting an image having a first feature to the generative model according to the aspect of the present disclosure.

A learning method according to another aspect of the present disclosure comprises acquiring a virtual image generated by the image generation apparatus according to the aspect of the present disclosure, and constructing a trained model by performing machine learning using the virtual image as supervised training data.

In addition, the learning method, the image generation method, and the other learning method according to the aspects of the present disclosure may be provided as a program for causing a computer to execute the methods.

According to the aspects of the present disclosure, natural images can be generated under actually assumed observation conditions of an image without significant modification to the network architecture and parameter tuning.

DETAILED DESCRIPTION

Figure 1:
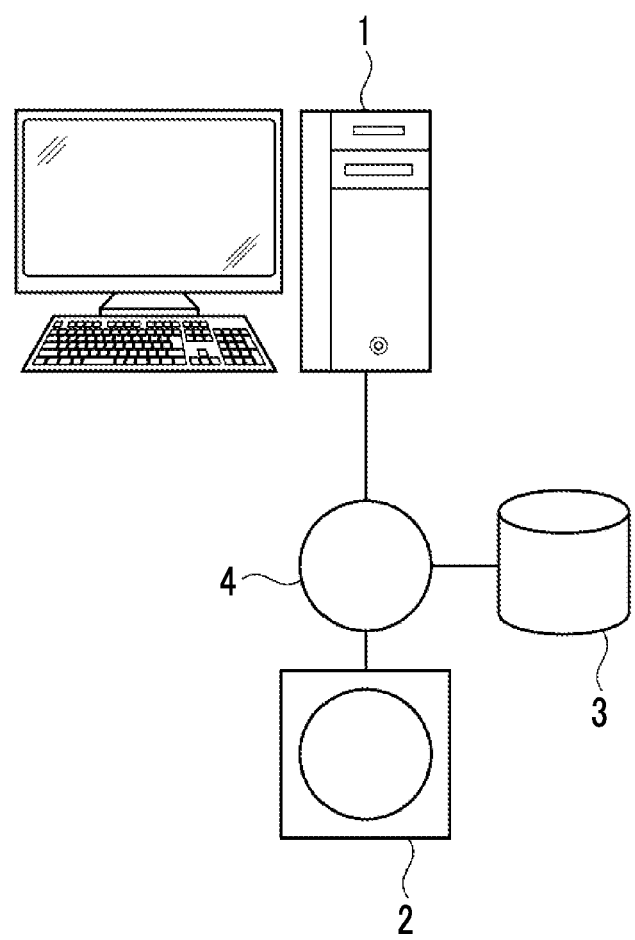
FIG. 1 is a diagram showing a schematic configuration of a medical information system to which a learning apparatus and an image generation apparatus according to a first embodiment of the present disclosure are applied.

Hereinafter, an embodiment of the present disclosure will be described with reference to the drawings. FIG. 1 is a hardware configuration diagram showing an overview of a medical information system to which a learning apparatus and an image generation apparatus according to a first embodiment of the present disclosure are applied. As shown in FIG. 1, in the medical information system, a computer 1 encompassing the learning apparatus and the image generation apparatus according to the first embodiment, an imaging apparatus 2, and an image storage server 3 are connected via a network 4 in a communicable state.

The computer 1 encompasses the learning apparatus and the image generation apparatus according to the first embodiment, and constitutes an image generation system, which will be described later, by installing a learning program and an image generation program according to the first embodiment. The computer 1 may be a workstation or a personal computer directly operated by a doctor performing diagnosis, or may be a server computer connected to a workstation and to a personal computer via a network. The learning program and the image generation program are stored in a storage apparatus of a server computer connected to the network or in a network storage in a state in which the network storage can be accessed from the outside, and are downloaded to and installed on the computer 1 used by a doctor in response to a request. Alternatively, the image processing program is recorded on a recording medium, such as a digital versatile disc (DVD) or a compact disc read only memory (CD-ROM), and distributed, and is installed on the computer 1 from the recording medium.

The imaging apparatus 2 is an apparatus that generates a three-dimensional image representing diagnosis target parts of a subject by imaging the part, and the imaging apparatus 2 is, specifically, a CT apparatus, an MRI apparatus, a positron emission tomography (PET) apparatus, or the like. A three-dimensional image consisting of a plurality of slice images generated by the imaging apparatus 2 is transmitted to and saved in the image storage server 3.

The image storage server 3 is a computer that saves and manages various types of data, and includes a large-capacity external storage apparatus and database management software. The image storage server 3 communicates with another apparatus via the wired or wireless network 4, and transmits/receives image data or the like. Specifically, various types of data including image data of a three-dimensional image generated by the imaging apparatus 2 are acquired via a network and saved in a recording medium such as a large-capacity external storage apparatus and managed. The storage format of the image data and the communication between the respective apparatuses via the network 4 are based on a protocol such as digital imaging and communication in medicine (DICOM). The image storage server 3 also stores training images, which will be described later.

Figure 2:
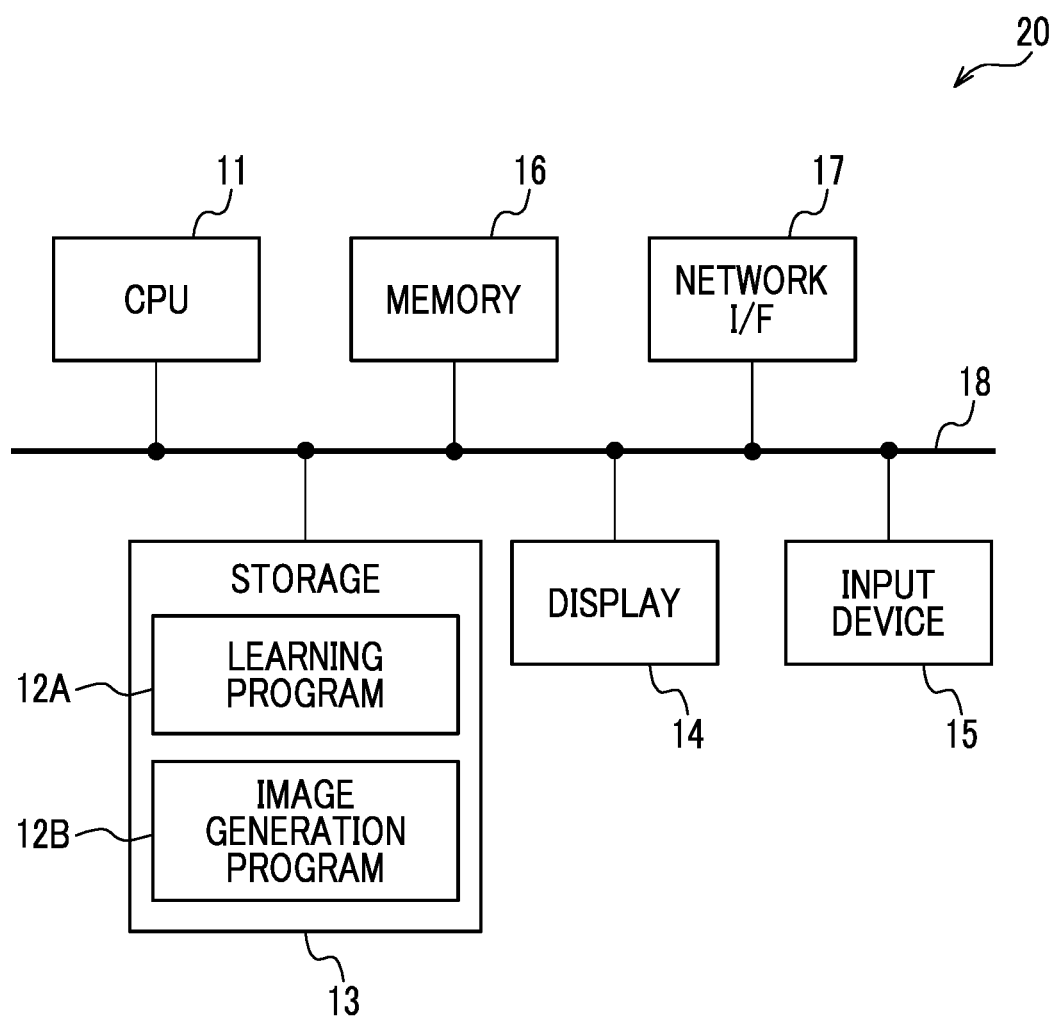
FIG. 2 is a diagram showing a schematic configuration of an image generation system including the learning apparatus and the image generation apparatus according to the first embodiment.

Next, the learning apparatus and the image generation apparatus according to the first embodiment will be described. FIG. 2 illustrates a hardware configuration of an image generation system 20 including the learning apparatus and the image generation apparatus according to the first embodiment. As shown in FIG. 2, the image generation system 20 according to the first embodiment includes a central processing unit (CPU) 11, a non-volatile storage 13, and a memory 16 as a temporary storage area. Further, the image generation system 20 includes a display 14 such as a liquid crystal display, an input device 15 such as a keyboard and a mouse, and a network interface (I/F) 17 connected to the network 4. The CPU 11, the storage 13, the display 14, the input device 15, the memory 16, and the network I/F 17 are connected to a bus 18. The CPU 11 is an example of a processor in the present disclosure.

The storage 13 is realized by a hard disk drive (HDD), a solid state drive (SSD), a flash memory, and the like. A learning program 12A and an image generation program 12B are stored in the storage 13 as a storage medium. The CPU 11 reads out the learning program 12A and the image generation program 12B from the storage 13, loads the read-out programs into the memory 16, and executes the loaded learning program 12A and image generation program 12B.

Figure 3:
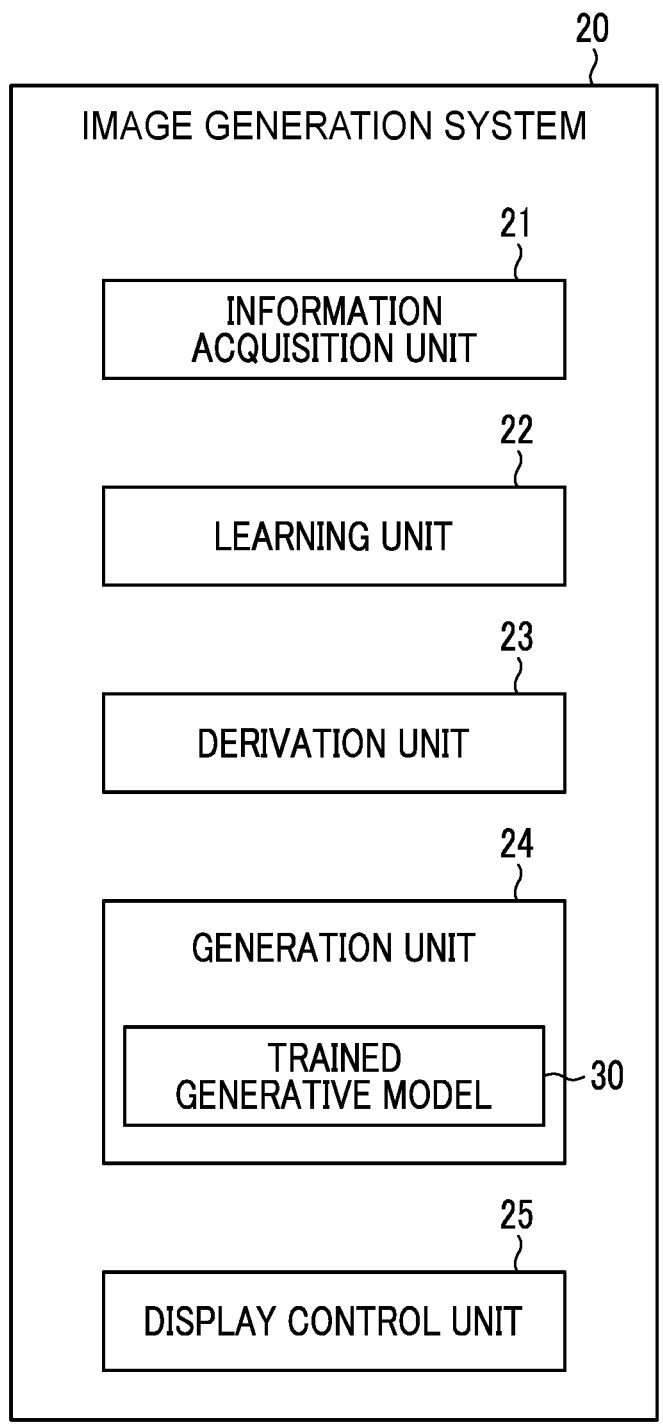
FIG. 3 is a functional configuration diagram of the image generation system according to the first embodiment.
Figure 4:
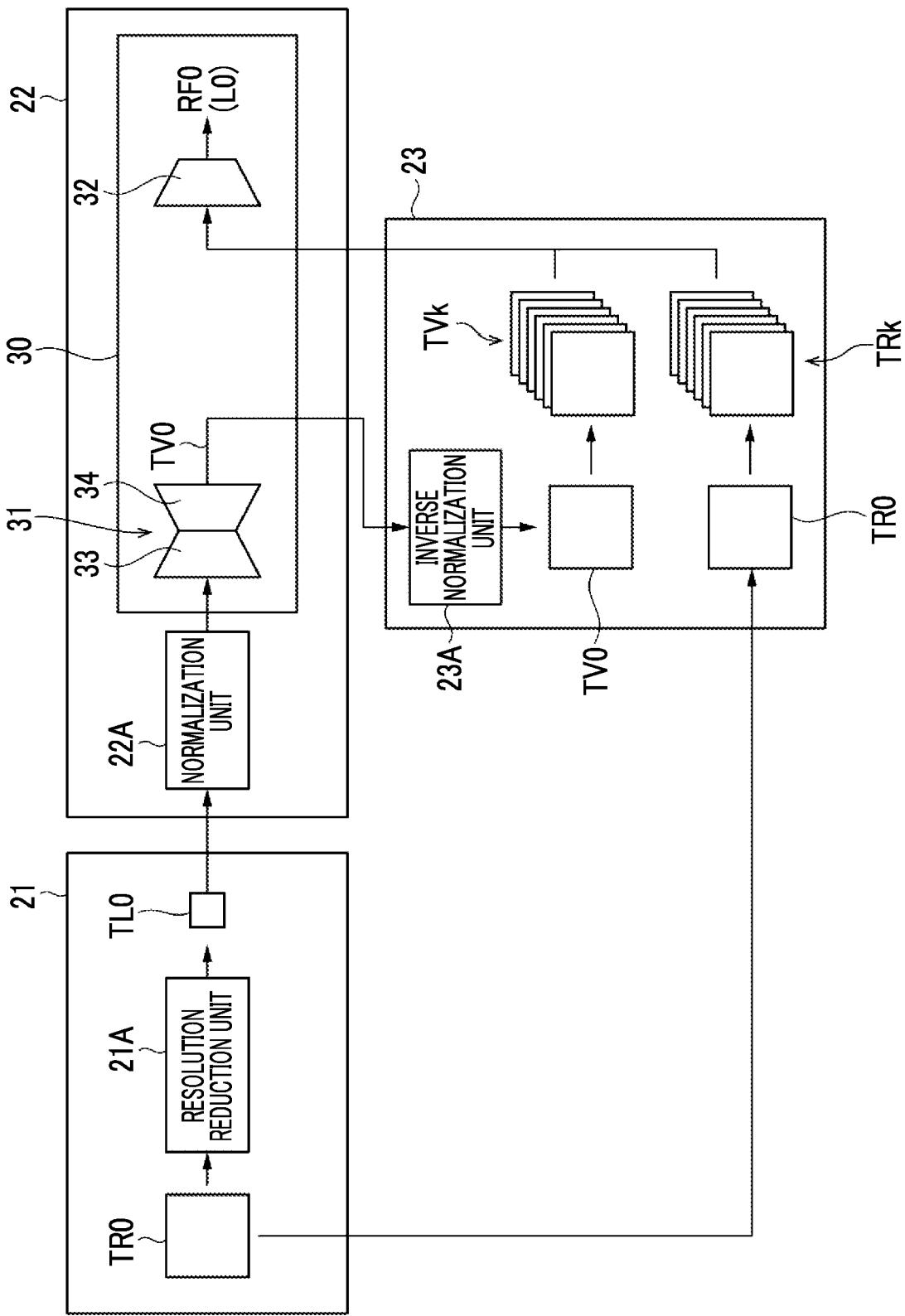
FIG. 4 is a conceptual diagram showing learning processing of a generative model in the first embodiment.

Next, a functional configuration of the image generation system according to the first embodiment will be described. FIG. 3 is a diagram showing a functional configuration of the image generation system according to the first embodiment. FIG. 4 is a conceptual diagram showing learning processing of a generative model in the first embodiment. As shown in FIG. 3, the image generation system 20 according to the first embodiment comprises an information acquisition unit 21, a learning unit 22, a derivation unit 23, a generation unit 24, and a display control unit 25. In a case where the CPU 11 executes the learning program 12A and the image generation program 12B, the CPU 11 functions as the information acquisition unit 21, the learning unit 22, the derivation unit 23, the generation unit 24, and the display control unit 25. The information acquisition unit 21, the learning unit 22, and the derivation unit 23 constitute the learning apparatus according to the first embodiment, and the information acquisition unit 21, the generation unit 24, and the display control unit 25 constitute the image generation apparatus according to the first embodiment.

Note that the image generation apparatus included in the image generation system 20 according to the first embodiment generates a virtual image having a second feature from an input image having a first feature. In the first embodiment, it is assumed that the image generation apparatus executes a task of generating a high resolution virtual image from a relatively low resolution input image, for example, as described in "Virtual Thin Slice: 3D Conditional GAN-based Super-resolution for CT Slice Interval", Akira Kudo et al., 30 Aug. 2019, arXiv: 1908.11506. In this case, relatively low resolution is the first feature, and high resolution is the second feature.

The information acquisition unit 21 acquires a CT image of a subject from the image storage server 3 via the network I/F 17 as a target image G0 for increasing the resolution. The information acquisition unit 21 also acquires a training image TR0 from the image storage server 3. Note that the training image TR0 is a CT image acquired by the imaging apparatus 2. The target image G0 and a virtual image GV0 have resolutions set in the imaging apparatus 2. Here, since the CT image is a three-dimensional image, the resolutions of the target image G0 and the virtual image GV0 are determined by a slice interval of tomographic images forming the CT image and by the number of vertical and horizontal pixels of each tomographic image.

The information acquisition unit 21 comprises a resolution reduction unit 21A as shown in FIG. 4. The resolution reduction unit 21A reduces the resolution of the training image TR0 to derive a low-resolution training image TL0. Specifically, the resolution reduction unit 21A thins out the slices of the training image TR0 and down-samples the tomographic images included in the training image TR0 to derive the low-resolution training image TL0. Here, the training image TL0 has a low-resolution feature, that is, a first feature. Also, the training image TR0 has a high-resolution feature, that is, a second feature, compared to the training image TL0. The low-resolution training image TL0 is an example of a first training image, and the original-resolution training image TR0 before being reduced in resolution is an example of a second training image. Therefore, in the following description, the low-resolution training image TL0 is called the first training image TL0, and the original training image TR0 is called the second training image TR0. Note that the second training image TR0 is input to the derivation unit 23, which will be described later.

Since the first training image TL0 is obtained by reducing the resolution of the second training image TR0, the first training image TL0 has the same image content as the second training image TR0. Here, the same image content means that although the image quality is different, the images include the same parts of the same subject and the body postures included in the images are the same.

The learning unit 22 trains a generative model 30 for increasing the resolution of an input image to generate a high-resolution virtual image. For the sake of description, FIG. 4 shows that the learning unit 22 includes the generative model 30. As shown in FIG. 4, the generative model 30 includes a generator 31 and a discriminator 32. The generator 31 includes an encoder 33 and a decoder 34. In the first embodiment, the generator 31 and the discriminator 32 constitute a generative adversarial network (GAN).

The encoder 33 that constitutes the generator 31 consists of a convolutional neural network (CNN), which is one of multi-layered neural networks in which a plurality of processing layers are hierarchically connected, and derives a feature map representing feature amounts of the input image.

A convolutional neural network consists of a plurality of convolutional layers. The convolutional layer performs convolution processing using various kernels on the input image, and outputs a feature map consisting of feature amount data obtained by the convolution processing. The kernel has an n×n pixel size (for example, n=3), and weights are set for each element. Specifically, weights such as a differential filter that emphasizes edges of the input image are set. The convolutional layer applies the kernel to the entire input image or to the feature map output from the processing layer in the previous stage while shifting attention pixels of the kernel. Furthermore, the convolutional layer applies an activation function such as a sigmoid function to the convolved value, and outputs the feature map.

The decoder 34 derives a virtual image obtained by increasing the resolution of the input image based on the feature map derived by the encoder 33. The decoder 34 has a plurality of deconvolutional layers. The deconvolutional layer performs the same processing as the convolutional layer of the encoder 33, but derives a high-resolution virtual image by upsampling the input feature map and applying a kernel for the deconvolution operation to the feature map.

Figure 5:
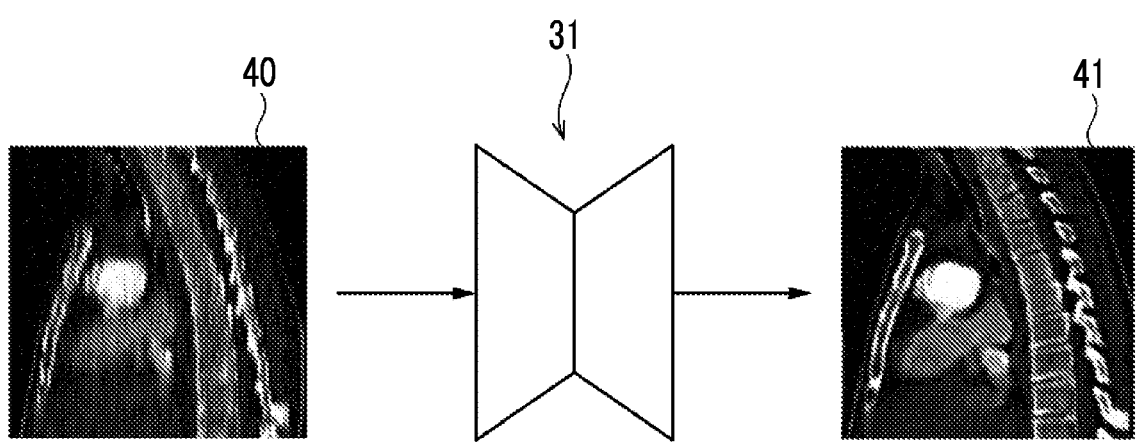
FIG. 5 is a diagram schematically showing processing performed by a generator.

FIG. 5 is a diagram schematically showing processing performed by the generator 31. As shown in FIG. 5, in a case where a relatively low-resolution image 40 is input to the generator 31, the generator 31 increases the resolution of the image 40 and outputs a high-resolution virtual image 41.

In the first embodiment, the learning unit 22 includes a normalization unit 22A and normalizes the image input to the generator 31 in order to efficiently train the generative model 30. Normalization is, for example, a process of converting the range of possible signal values of an input image into a predetermined range. In the first embodiment, the normalization unit 22A normalizes the range of possible signal values of the CT image so that the signal values range from 0 to 1, for example.

In a case of training the generative model 30, the learning unit 22 normalizes the first training image TL0 through the normalization unit 22A. Then, the learning unit 22 inputs the normalized first training image TL0 to the generator 31 to derive a high-resolution training virtual image TV0. Since the first training image TL0 input to the generator 31 is normalized, the training virtual image TV0 output from the generator 31 is also normalized. The training virtual image TV0 has a second feature because it has a high resolution. The training virtual image TV0 is input to the derivation unit 23.

The derivation unit 23 derives a plurality of types of conversion training images TRk (k=1 to n; n is the number of observation conditions) with different observation conditions by performing a plurality of types of observation condition conversion processing on the second training image TR0. Further, the derivation unit 23 derives a plurality of types of conversion training virtual images TVk with different observation conditions by subjecting the training virtual image TV0 to the same observation condition conversion processing as the plurality of observation condition conversion processing performed on the second training image TR0. The derivation unit 23 includes an inverse normalization unit 23A, and inversely normalizes the training virtual image TV0 in order to derive the conversion training virtual image TVk. Inverse normalization is conversion of signal values normalized to a range of 0 to 1, for example, into the original range of possible signal values of the CT image.

Figure 6:
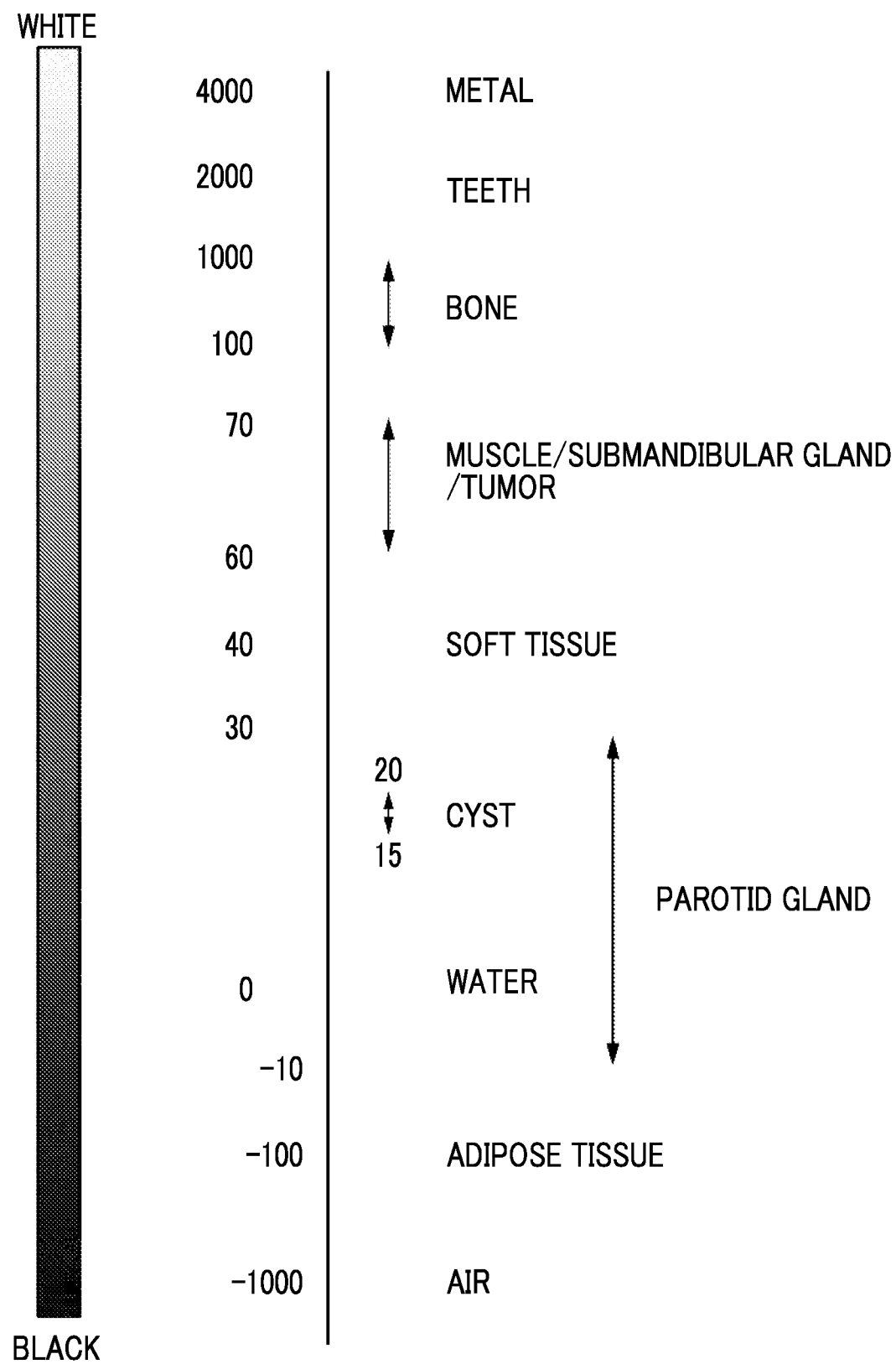
FIG. 6 is a diagram for describing CT values.

Here, in the first embodiment, the derivation unit 23 performs scale conversion processing as observation condition conversion processing. The scale conversion processing will be described below. Each pixel value of the CT image targeted by the first embodiment (hereinafter referred to as a CT value) is a numerical representation of the X-ray absorption rate of the human body. Specifically, as shown in FIG. 6, the CT value is determined according to the composition of the human body, such that the CT value of water is 0 and the CT value of air is −1000. Also, the CT value has a very wide range of possible values, such as −1000 to 4000. However, the range of gradations that can be reproduced by the display 14 is about 0 to 1024. Therefore, it is difficult to display all gradations included in the CT image on the display 14.

Therefore, in a case of displaying a CT image, observation conditions of the image are set so that a specific part can be easily seen, and the density and contrast of the CT image are converted based on the set observation conditions. Specifically, a window level (WL) and a window width (WW) are set as observation conditions. WL is a CT value that is the center of the part to be observed in the gradation displayable by the display 14 in a case where the CT image is displayed on the display 14. WW is a signal width between a lower limit value and an upper limit value of the CT value of the part to be observed.

Figures 7, 8:
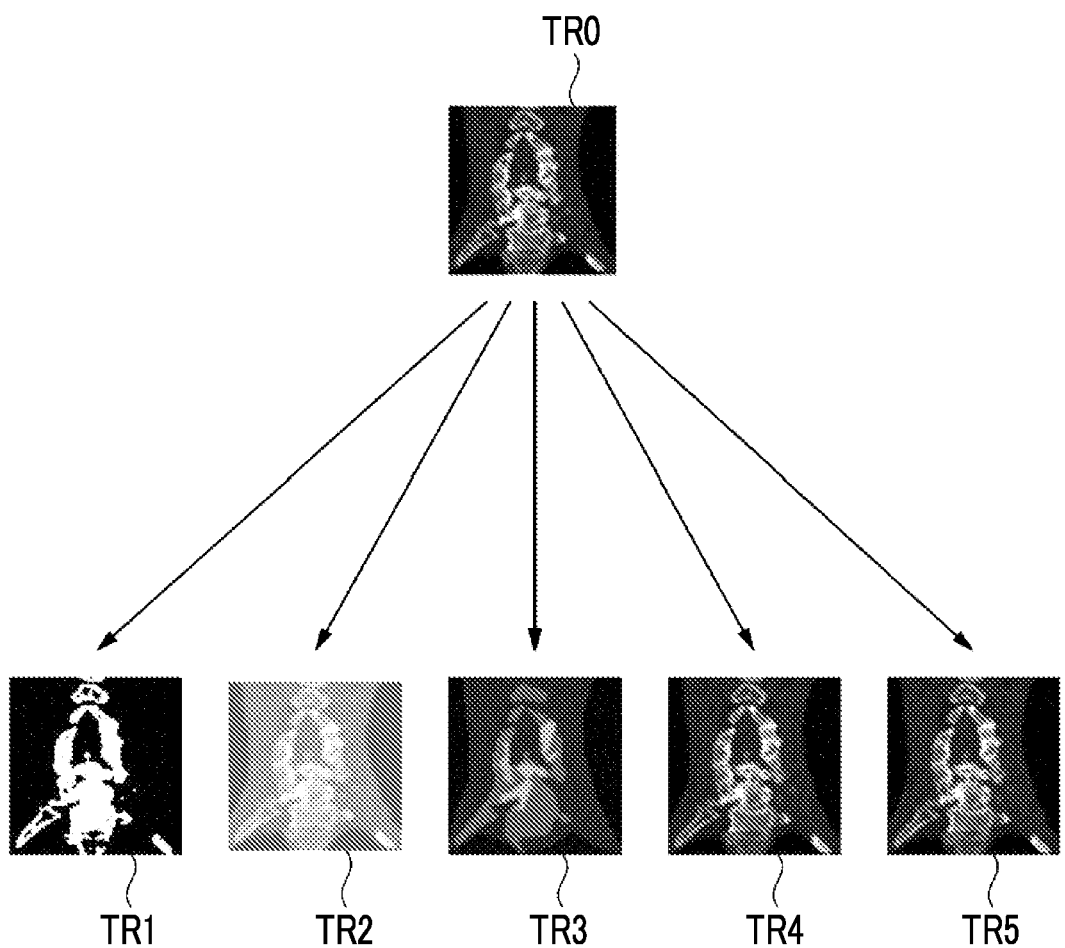
FIG. 7 is a diagram for describing WW and WL.
FIG. 8 is a diagram showing an example of a derived conversion training image.

FIG. 7 is a diagram showing examples of WW and WL. Numerical values shown in FIG. 7 are CT values in units of HU. As shown in FIG. 7, the WL is 20 to 60, and the WW is 300 to 400 under a mediastinum condition that facilitates observation of bones. In addition, the WL is −770 to −550, and the WW is 1000 to 1500 under a lung field condition that facilitates observation of a lung field. In addition, the WL is 20 to 60 and the WW is 60 to 120 under an observation condition that facilitates observation of a brain.

In the first embodiment, a plurality of observation conditions, which consist of combinations of WW and WL, are set. For example, as combinations of WW and WL, five types of observation conditions, (WW, WL)=(4096, 0), (1600, −600), (400, 0), (200, 50), (80, 40), are set. The derivation unit 23 converts the training virtual image TV0 and the second training image TR0 according to each of the plurality of types of observation conditions, thereby deriving the plurality of types of conversion training virtual images TVk and the plurality of types of conversion training images TRk. In a case of deriving the plurality of types of conversion training virtual images TVk and the plurality of types of conversion training images TRk, the derivation unit 23 performs scale conversion processing. Since the scale conversion processing for the training virtual image TV0 and the second training image TR0 is the same, the scale conversion processing for the training image TR0 will be described here.

The derivation unit 23 clips CT values outside the range of the observation conditions to be derived for the CT values of the pixels of the training image TR0. For example, in a case where the observation condition is (WW, WL)=(400, 0), the derivation unit 23 sets WL as a range of CT values of 400 centering on 0 in the training image TR0. In this case, the range of CT values is −200 to 200. Then, the derivation unit 23 clips CT values outside the set range. That is, the range of CT values smaller than −200 is converted to −200, and the range of CT values larger than 200 is converted to 200.

Then, the derivation unit 23 uses the minimum and maximum values of the CT values in the set range to derive the pixel value of each pixel of the training image TR0 according to the following Equation (1), thereby performing scale conversion processing. In Equation (1), $p\_min$ and $p\_max$ are the minimum and maximum values of the CT values under the set observation conditions, $pb\_i$ is the pixel value of a pixel i in the training image TR0 before scale conversion processing, and $pp\_i$ is the pixel value of a pixel i in the training image TR0 after scale conversion processing. $pp\_i$ derived from Equation (1) is normalized to a range of 0 to 1.

$$pp\_i = (pb\_i - p\_min)/(p\_max - p\_min) \quad (1)$$

Note that the scale conversion processing is not limited to the one performed by the above Equation (1). For example, within the range of the minimum and maximum values of the CT values under the set observation conditions, scale conversion processing may be performed such that the average value is 0 and the standard deviation is 1, using the following Equation (2). In Equation (2), $\mu$ is the average value of the signal values within the range between the minimum and maximum values of the CT values under the set observation conditions, and $\sigma$ is the standard deviation of the signal values in that range.

$$pp\_i = (pb\_i - \mu)/\sigma \quad (2)$$

As the scale conversion processing, any known method such as a method using a median value or a quantile within the range of the minimum and maximum values of the CT values under the set observation conditions can be used.

The derivation unit 23 scale-converts the training virtual image TV0 and the second training image TR0 according to each of the plurality of types of observation conditions, thereby deriving the plurality of types of conversion training virtual images TVk and the plurality of types of conversion training images TRk. FIG. 8 is a diagram showing an example of the derived conversion training image. As shown in FIG. 8, the derivation unit 23 derives five types of conversion training images TR1 to TR5 having different densities and contrasts from the training image TR0.

Referring back to the learning unit 22, the discriminator 32 consists of, for example, a convolutional neural network, discriminates whether the input image is a real image or a virtual image generated by the generator 31, and outputs a discrimination result RF0. Here, the real image is not an image generated by the generator 31, but an image acquired by imaging the subject with the imaging apparatus 2, and an image obtained by the derivation unit 23 performing scale conversion processing on the acquired image. On the other hand, the virtual image is a virtual image generated from the real image by the generator 31 and an image obtained by derivation unit 23 performing scale conversion processing on the virtual image.

Therefore, in a case where the discriminator 32 discriminates that the input real image is a real image, the discrimination result RF0 is correct, and in a case where the discriminator 32 discriminates that the input real image is a virtual image, the discrimination result RF0 is incorrect. In addition, in a case where the discriminator 32 discriminates that the input virtual image is a real image, the discrimination result RF0 is incorrect, and in a case where the discriminator 32 discriminates that the input virtual image is a virtual image, the discrimination result RF0 is correct.

In the first embodiment, in a case where the conversion training virtual image TVk is input to the discriminator 32 during learning, the discrimination result RF0 is correct in a case where the discrimination result RF0 is a virtual image, and the discrimination result RF0 is incorrect in a case where the discrimination result RF0 is a real image. In addition, in a case where the conversion training image TRk, which is a real image, is input to the discriminator 32 during learning, the discrimination result RF0 is correct in a case where the discrimination result RF0 is a real image, and the discrimination result RF0 is incorrect in a case where the discrimination result RF0 is a virtual image.

The learning unit 22 derives a loss based on the discrimination result RF0 output by the discriminator 32. This loss is called adversarial loss. In the present embodiment, the adversarial loss in the discriminator 32 is assumed to be a loss L0.

In the first embodiment, the learning unit 22 trains the discriminator 32 so as to correct the discrimination result RF0 as to whether the input image is a real image or a virtual image generated by the generator 31. That is, the learning unit 22 trains the discriminator 32 so that the loss L0 is maximized. In addition, the learning unit 22 derives a high-resolution virtual image resembling a real image from the input image, and trains the generator 31 so that the discriminator 32 makes the discrimination result RF0 an incorrect answer.

As the learning progresses, the generator 31 and the discriminator 32 mutually improve their accuracy, and the generator 31 can generate a high-resolution CT image that is closer to the real CT image and that is not discriminated by the discriminator 32. In the first embodiment, the generator 31 in the trained generative model 30 is applied to the generation unit 24, which will be described later.

Note that in the first embodiment, the discriminator 32 outputs the discrimination results RF0 corresponding to the number of set observation conditions. In learning, training of the generator 31 and the discriminator 32 may be performed by using the loss L0 derived based on the individual discrimination results RF0, and training of the generator 31 and the discriminator 32 may be performed by deriving the total sum of losses L0 derived based on the individual discrimination results RF0 and using the total sum of the losses L0.

In a case where the target image G0 to be processed is input to the image generation system 20 by applying the trained generative model 30, the generation unit 24 increases the resolution of the target image G0 using the trained generative model 30, and derives the high-resolution virtual image GV0. Although the target image G0 is a CT image, the density and contrast are converted based on specific observation conditions, so that specific structures included in the CT image are easy to see.

Figure 9:
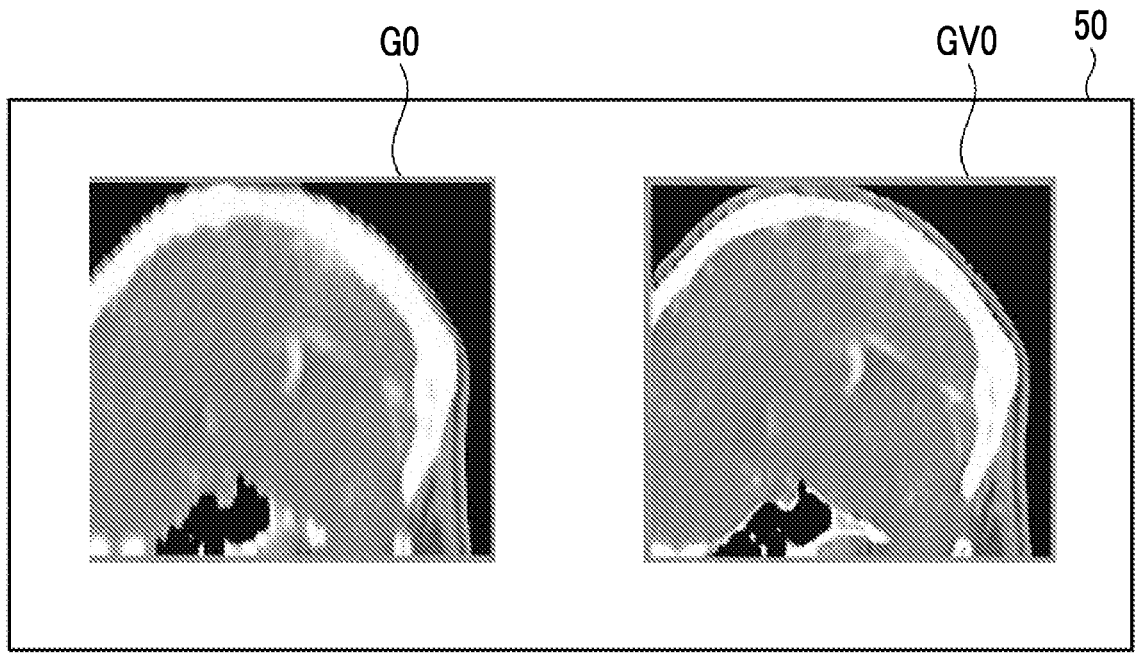
FIG. 9 is a diagram showing a display screen of a target image and a virtual image.

The display control unit 25 displays, on the display 14, the high-resolution virtual image GV0 generated from the target image G0. FIG. 9 is a diagram showing a display screen of the high-resolution virtual image GV0. As shown in FIG. 9, the display screen 50 displays the high-resolution virtual image GV0 including a head as a subject and the target image G0 to be processed. As shown in FIG. 9, it can be seen that the virtual image GV0 has a higher resolution than the target image G0.

Figure 10:
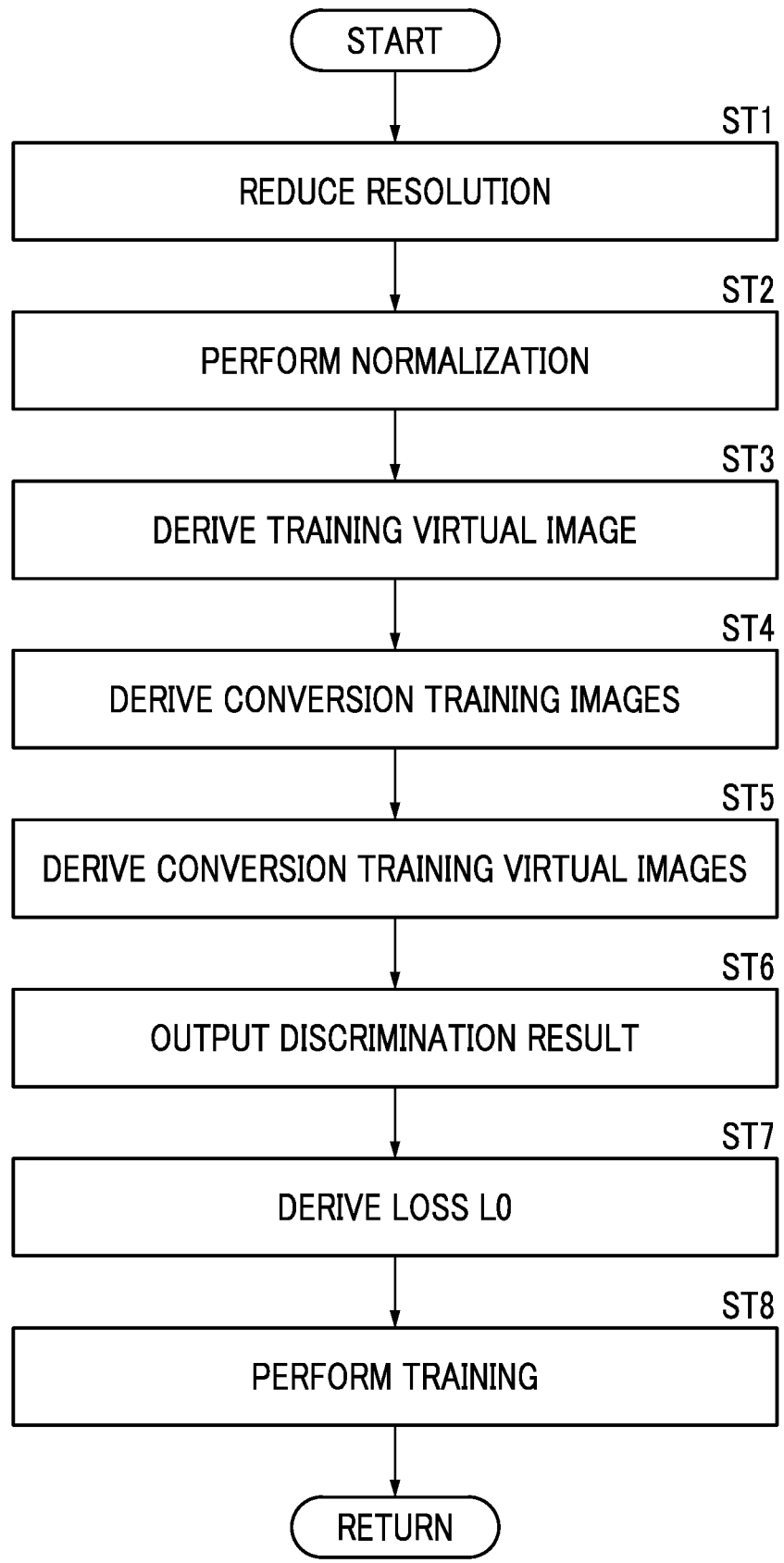
FIG. 10 is a flowchart showing learning processing performed in the first embodiment.

Next, a process performed in the first embodiment will be described. FIG. 10 is a flowchart showing learning processing performed in the first embodiment. It is assumed that the training image (that is, the second training image TR0) is acquired from the image storage server 3 by the information acquisition unit 21 and is saved in the storage 13. First, the resolution reduction unit 21A of the information acquisition unit 21 reduces the resolution of the second training image TR0 to derive the first training image TL0 (Step ST1).

Next, the normalization unit 22A of the learning unit 22 normalizes the first training image TL0 (Step ST2), and inputs the normalized first training image TL0 to the generator 31. The generator 31 derives the training virtual image TV0 (Step ST3). On the other hand, the derivation unit 23 derives the plurality of types of conversion training images TRk by performing a plurality of types of scale conversion processing on the second training image TR0 (Step ST4). Further, the derivation unit 23 derives the plurality of types of conversion training virtual images TVk by performing a plurality of types of scale conversion processing on the training virtual image TV0 (Step ST5).

Then, the learning unit 22 inputs the plurality of types of conversion training images TRk and the plurality of types of conversion training virtual images TVk to the discriminator 32. The discriminator 32 outputs the discrimination result RF0 (Step ST6).

Next, the learning unit 22 derives the loss L0 based on the discrimination result RF0 (Step ST7). Furthermore, the learning unit 22 trains the generator 31 and the discriminator 32 based on the loss L0 (Step ST8). Then, the process returns to Step ST1, the next training image is acquired from the storage 13, and the processes of Steps ST1 to ST8 are repeated. Thereby, the trained generative model 30 is constructed.

The learning unit 22 repeats learning so that the loss L0 is maximized, but may repeat learning a predetermined number of times.

Figure 11:
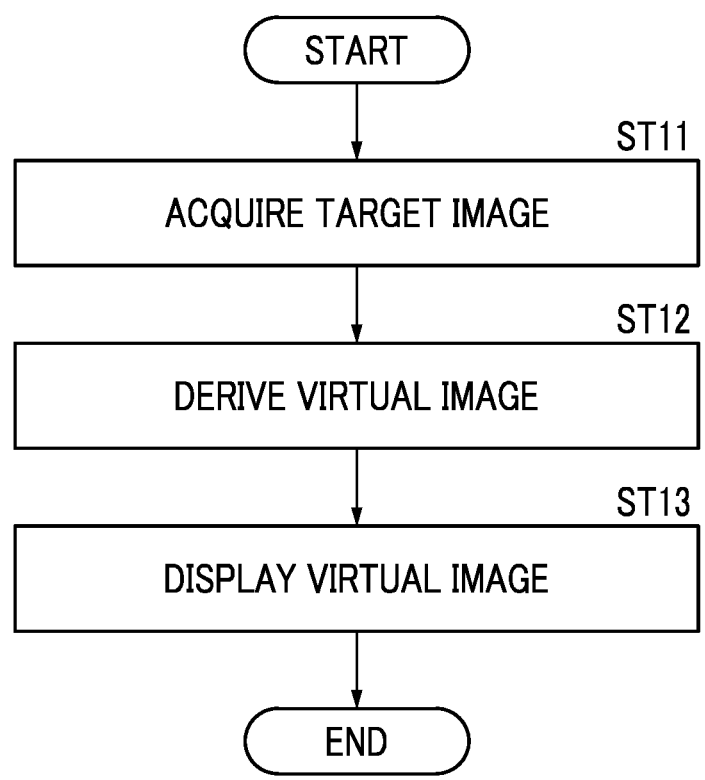
FIG. 11 is a flowchart showing image generation processing performed in the first embodiment.

Next, image generation processing performed in the first embodiment will be described. FIG. 11 is a flowchart showing image generation processing performed in the first embodiment. The information acquisition unit 21 acquires the target image G0 to be processed (Step ST11), and the generation unit 24 increases the resolution of the target image G0 to derive the high-resolution virtual image GV0 by inputting the target image G0 to the trained generative model 30 (Step ST12). Then, the display control unit 25 displays the virtual image GV0 on the display 14 (Step ST13), and the process ends. Note that in a case where the target image G0 is input to the trained generative model 30, the generation unit 24 normalizes the target image G0. In this case, since the virtual image GV0 output from the trained generative model 30 is normalized, the generation unit 24 performs inverse normalization to derive the virtual image GV0.

In this way, in the first embodiment, in the case of training the generative model 30, the plurality of types of conversion training images TRk with different observation conditions are derived by performing a plurality of types of observation condition conversion processing on the second training image TR0 and the plurality of types of conversion training virtual images TVk with different observation conditions are derived by performing a plurality of types of observation condition conversion processing on the training virtual image TV0 output from the generator 31. Then, the discrimination result RF0 as to whether the plurality of types of conversion training images TRk and the plurality of types of conversion training virtual images TVk are real images or virtual images is output from the discriminator 32, and the generator 31 and the discriminator 32 are trained based on the discrimination result RF0.

Therefore, as the learning progresses, the generator 31 and the discriminator 32 mutually improve their accuracy, and the discriminator 32 can more accurately discriminate whether the image is a real image or a virtual image regardless of the input image under any observation conditions. In addition, the generator 31 can generate a high-resolution virtual image closer to the real image, which is not discriminated by the discriminator 32, regardless of the observation conditions of the input image. In particular, in the first embodiment, since the plurality of types of conversion training images TRk and the plurality of types of conversion training virtual images TVk with different observation conditions are input to the discriminator 32, a high-resolution virtual image closer to the real image can be generated regardless of the input image under any observation conditions. Also, in the first embodiment, only the image is input to the generator 31, and no categorical information such as observation conditions is input thereto as described in Mehdi Mirza et al. Therefore, according to the first embodiment, it is possible to generate natural images under actually assumed observation conditions of an image without making significant modifications to the network architecture.

Figure 12:
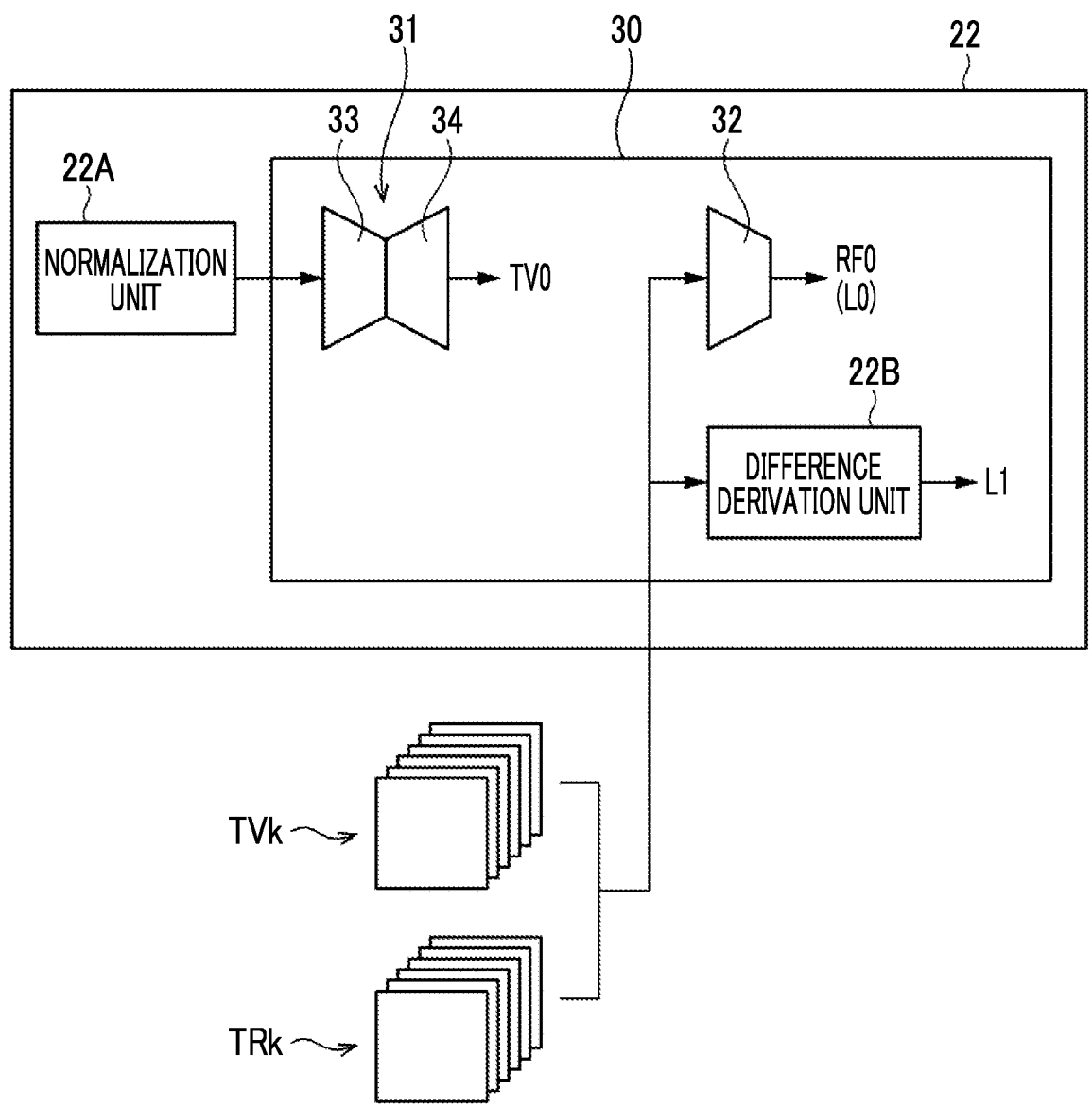
FIG. 12 is a conceptual diagram showing learning processing of a generative model in a second embodiment.

Next, a second embodiment of the present disclosure will be described. Since the configuration of a learning apparatus and an image generation apparatus according to the second embodiment is the same as the configuration of the learning apparatus and the image generation apparatus according to the first embodiment and only the processing performed during learning is different, detailed description of the apparatuses will be omitted here. FIG. 12 is a conceptual diagram showing learning processing of a generative model in the second embodiment. In FIG. 12, only the learning unit 22 in FIG. 4 is shown, and the information acquisition unit 21 and the derivation unit 23 are omitted.

Figure 13:
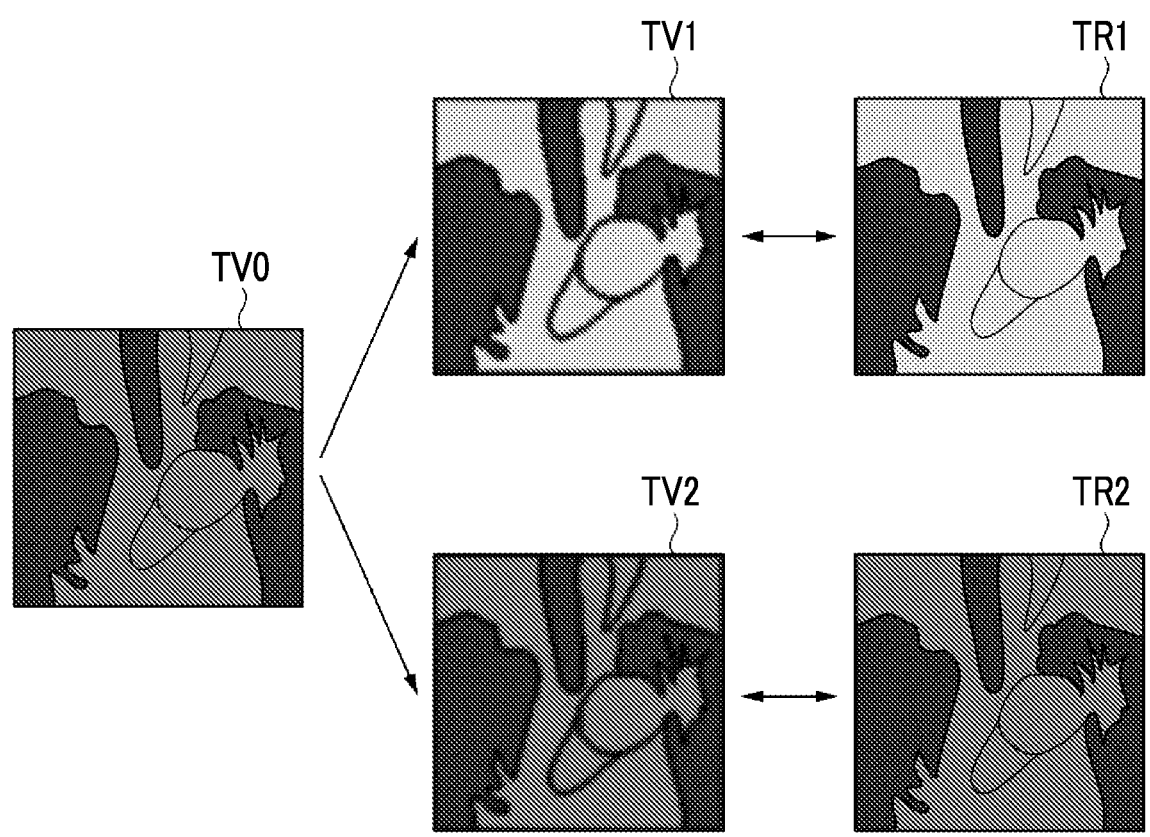
FIG. 13 is a diagram for describing a difference between a conversion training image TRk and a conversion training virtual image TVk that have been subjected to scale conversion processing.

Here, it is desirable that the training virtual image TV0 output by the generator 31 completely matches the second training image TR0, but the training virtual image TV0 has undergone processing by the generator 31, and thus a difference occurs between the training virtual image TV0 and the second training image TR0. As a result, a difference occurs between the conversion training image TRk and the conversion training virtual image TVk that have been subjected to the same type of scale conversion processing. FIG. 13 is a diagram for describing a difference between the conversion training image TRk and the conversion training virtual image TVk that have been subjected to scale conversion processing. As shown in FIG. 13, it is assumed that conversion training virtual images TV1 and TV2 are derived from the training virtual image TV0 by two types of scale conversion processing. It is also assumed that conversion training images TR1 and TR2 are derived from the second training image TR0 by two similar types of scale conversion processing.

In the second embodiment, the learning unit 22 comprises a difference derivation unit 22B, and derives a difference between the conversion training image TRk and the conversion training virtual image TVk that have been subjected to the same type of scale conversion processing as a loss L1. That is, the difference between the conversion training virtual image TV1 and the conversion training image TR1 shown in FIG. 13 and the difference between the conversion training virtual image TV2 and the conversion training image TR2 are derived as the loss L1. Note that the difference derivation unit 22B derives the total sum of the absolute values of the differences between corresponding pixels between the conversion training image TRk and the conversion training virtual image TVk that have been subjected to the same type of scale conversion processing as the loss L1, but the present disclosure is not limited thereto. The total sum of the square sums of the differences between the corresponding pixels may be derived as the loss L1.

In the second embodiment, the learning unit 22 trains the generator 31 and the discriminator 32 based on the loss L0 based on the discrimination result RF0 output by the discriminator 32 and on the loss L1 derived by the difference derivation unit 22B. That is, in the second embodiment, the learning unit 22 trains the discriminator 32 so as to correct the discrimination result RF0 as to whether the input image is a real image or a virtual image generated by the generator 31. That is, the learning unit 22 trains the discriminator 32 so that the loss L0 is maximized. In addition, the learning unit 22 derives a high-resolution virtual image resembling a real image from the input image, and trains the generator 31 so that the discriminator 32 makes the discrimination result RF0 an incorrect answer and the loss L1 is minimized. The expression "training so that the loss L1 is minimized" preferably means training so that the loss L1 becomes 0 or less than or equal to a predetermined threshold value.

Note that in the second embodiment, the losses L0 and L1 corresponding to the number of set observation conditions are derived. In learning, the generator 31 and the discriminator 32 may be trained by using the loss L0 and the loss L1 derived based on the discrimination result RF0 for each observation condition. Further, the generator 31 and the discriminator 32 may be trained by deriving the total sum of the losses L0 and the total sum of the losses L1 derived based on the individual discrimination results RF0 and using the total sum of the losses L0 and the total sum of the losses L1.

Figure 14:
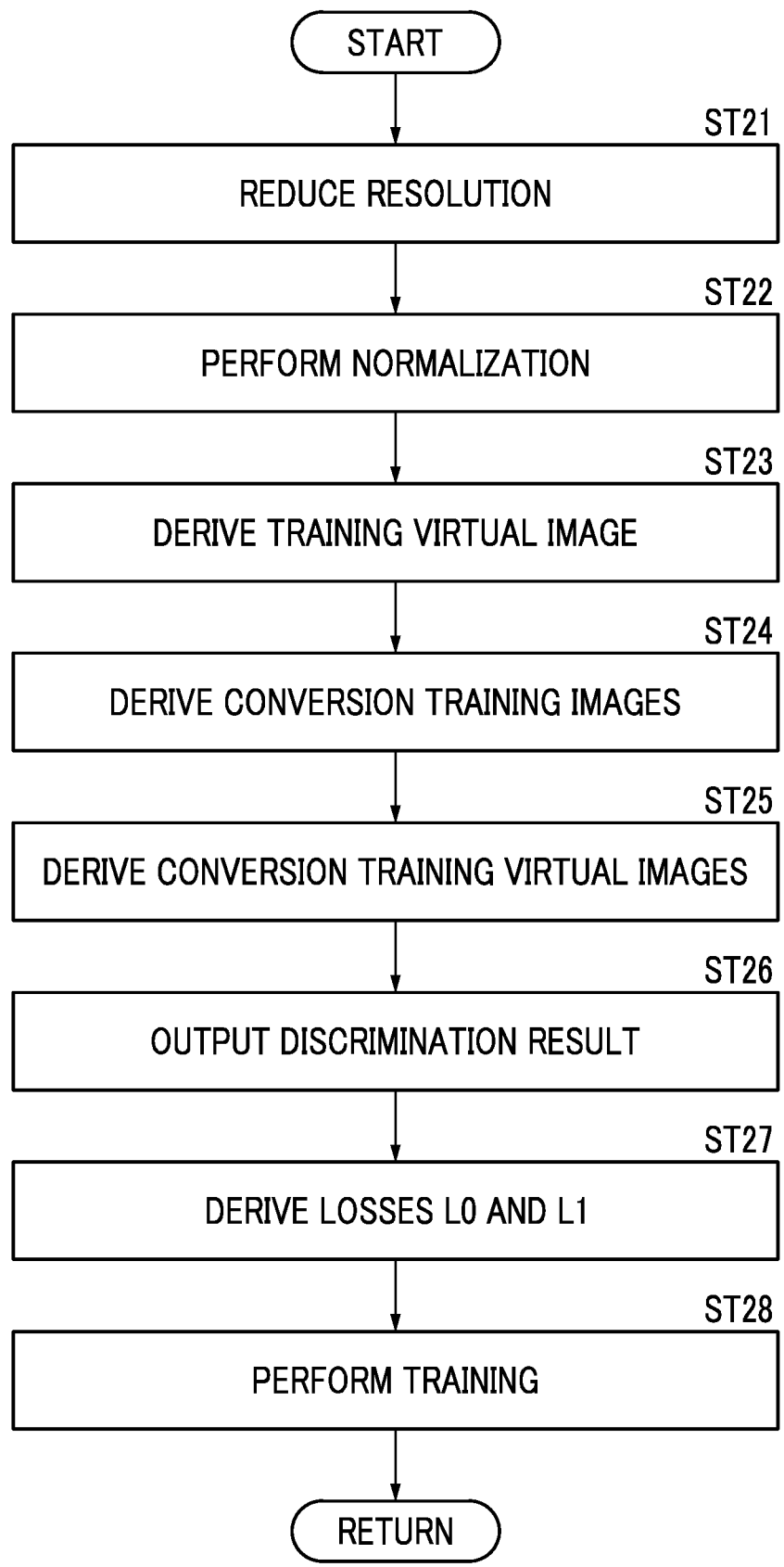
FIG. 14 is a flowchart showing learning processing performed in the second embodiment.

Next, a process performed in the second embodiment will be described. FIG. 14 is a flowchart showing a process performed in the second embodiment. Note that the processing from Step ST21 to Step ST26 in the flowchart shown in FIG. 14 is the same as the processing from Step ST1 to Step ST6 shown in FIG. 10, so detailed description thereof will be omitted here. In the second embodiment, following Step ST26, the learning unit 22 derives the loss L0 based on the discrimination result RF0, and derives a difference between the conversion training image TRk and the conversion training virtual image TVk that have been subjected to the same type of scale conversion processing as the loss L1 (Step ST27). Furthermore, the learning unit 22 trains the generator 31 and the discriminator 32 based on the losses L0 and L1 (Step ST28). Then, the process returns to Step ST21, the next training image is acquired from the storage 13, and the processes of Steps ST21 to ST28 are repeated. Thereby, the trained generative model 30 is constructed.

Figure 15:
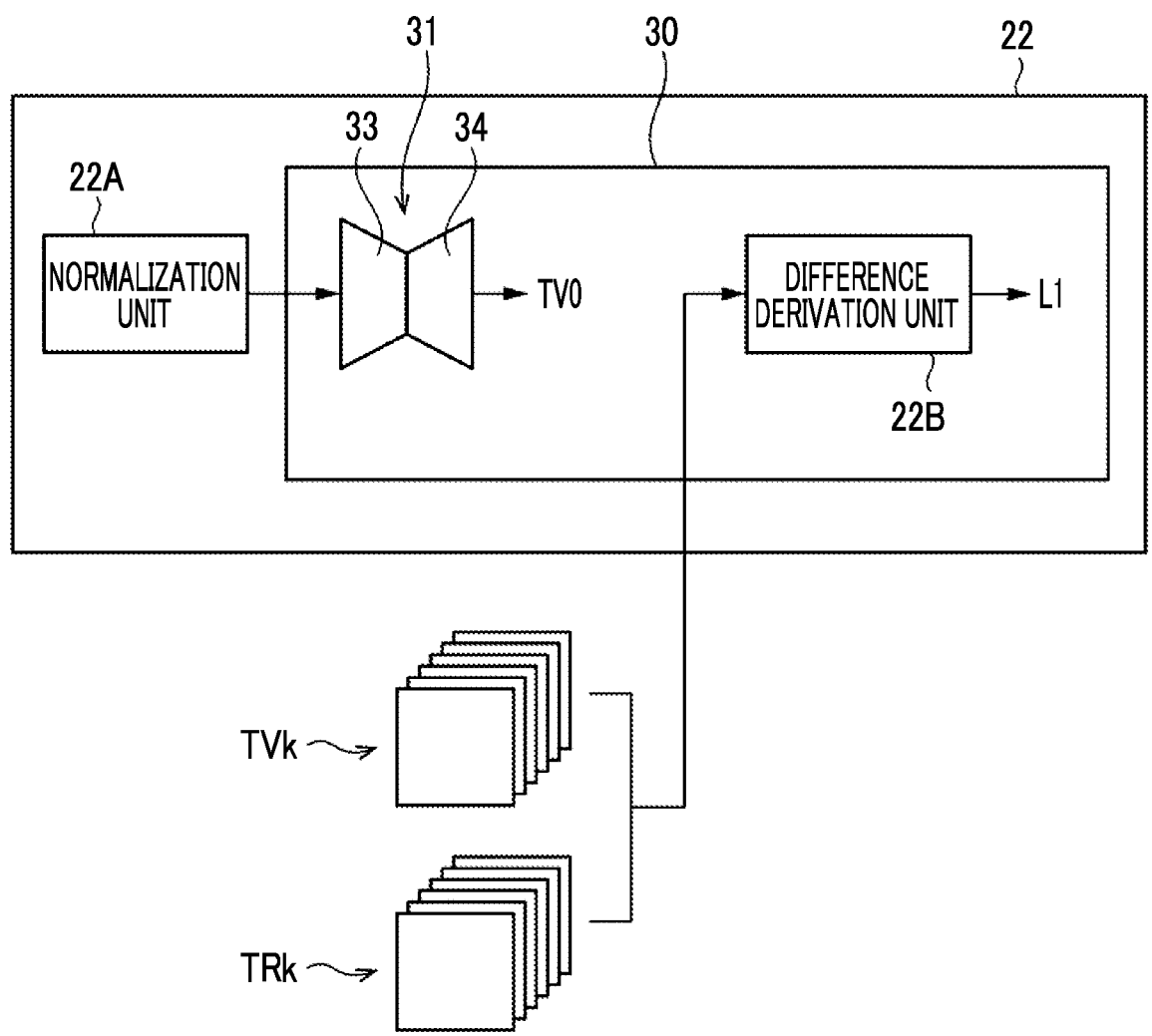
FIG. 15 is a conceptual diagram showing learning processing of a generative model in a third embodiment.

Next, a third embodiment of the present disclosure will be described. Since the configuration of a learning apparatus and an image generation apparatus according to the third embodiment is the same as the configuration of the learning apparatus and the image generation apparatus according to the first embodiment and only the processing performed during learning is different, detailed description of the apparatuses will be omitted here. FIG. 15 is a conceptual diagram showing learning processing of a generative model in the third embodiment. In FIG. 15, only the learning unit 22 in FIG. 4 is shown, and the information acquisition unit 21 and the derivation unit 23 are omitted.

As shown in FIG. 15, the third embodiment differs from the first embodiment in that the discriminator 32 is omitted, and the learning unit 22 comprises the difference derivation unit 22B, and trains the generator 31 based only on the loss L1, which is the difference between the conversion training image TRk and the conversion training virtual image TVk that have been subjected to the same type of scale conversion processing.

In the third embodiment, the learning unit 22 trains the generator 31 based only on the loss L1. That is, in the third embodiment, the learning unit 22 derives a high-resolution virtual image resembling a real image from the input image, and trains the generator 31 so that the loss L1 is minimized. The expression "training so that the loss L1 is minimized" preferably means training so that the loss L1 becomes 0 or less than or equal to a predetermined threshold value.

Note that in the third embodiment, the loss L1 corresponding to the number of set observation conditions is derived. In learning, the generator 31 may be trained by using the loss L1 derived for each observation condition. Further, the generator 31 may be trained by deriving the total sum of the losses L1 derived based on the individual observation conditions and using the total sum of the losses L1.

Figure 16:
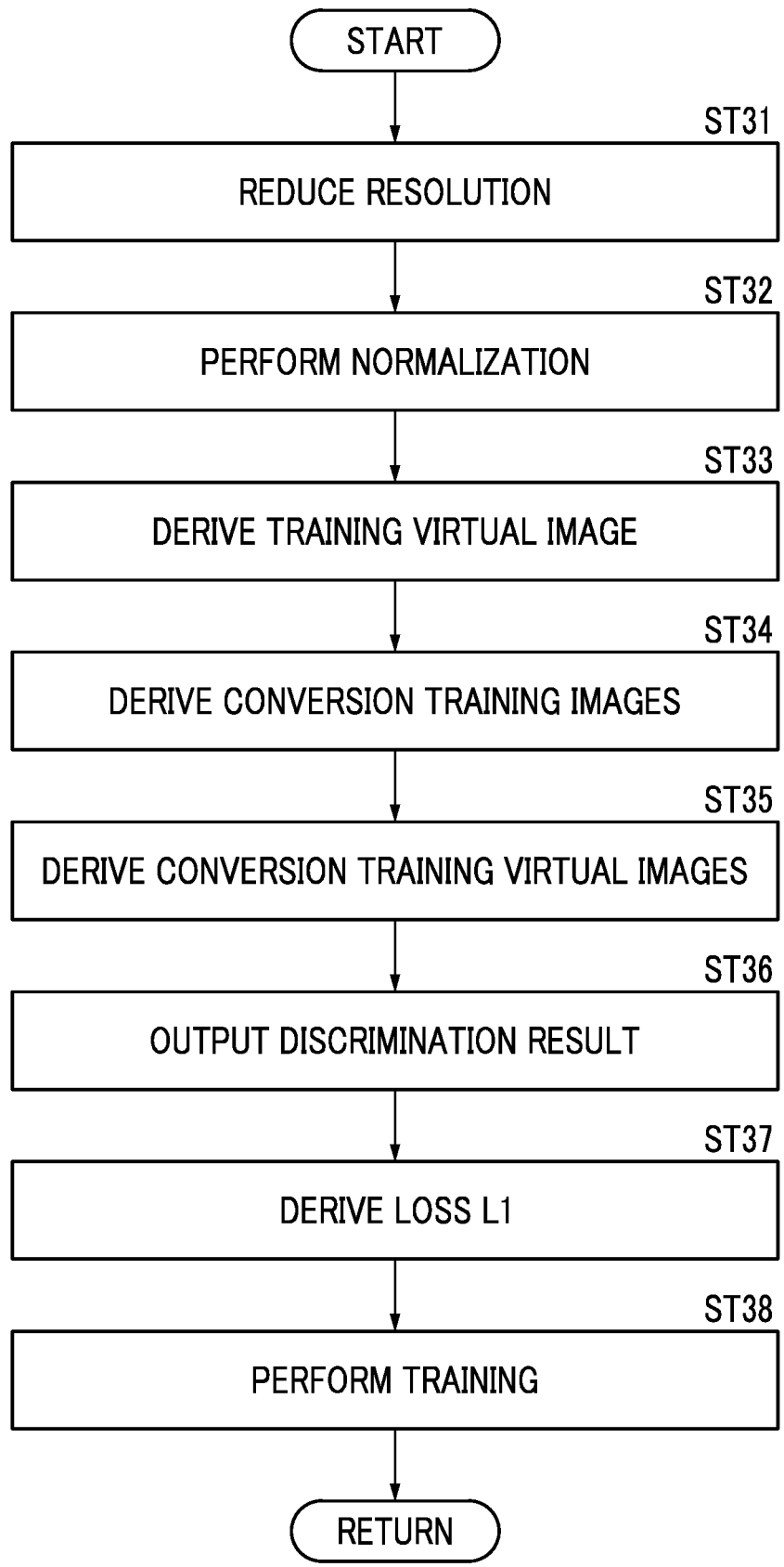
FIG. 16 is a flowchart showing learning processing performed in the third embodiment.

Next, a process performed in the third embodiment will be described. FIG. 16 is a flowchart showing a process performed in the third embodiment. Note that the processing from Step ST31 to Step ST36 in the flowchart shown in FIG. 16 is the same as the processing from Step ST1 to Step ST6 shown in FIG. 10, so detailed description thereof will be omitted here. In the third embodiment, following Step ST36, the learning unit 22 derives a difference between the conversion training image TRk and the conversion training virtual image TVk that have been subjected to the same type of scale conversion processing as the loss L1 (Step ST37). Furthermore, the learning unit 22 trains the generator 31 based on the loss L1 (Step ST38). Then, the process returns to Step ST31, the next training image is acquired from the storage 13, and the processes of Steps ST31 to ST38 are repeated. Thereby, the trained generative model 30 is constructed.

Figure 17:
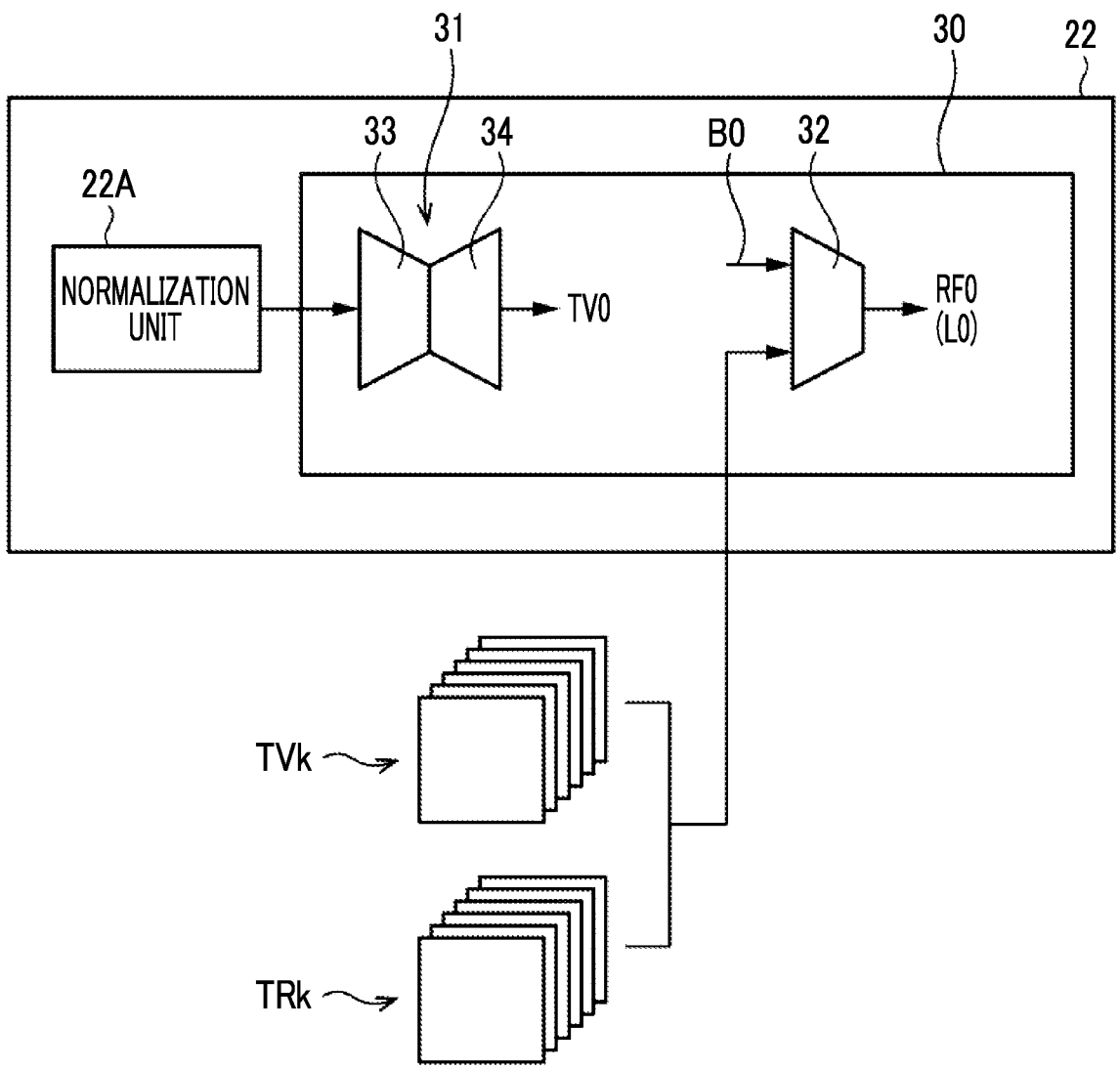
FIG. 17 is a conceptual diagram showing learning processing of a generative model in a fourth embodiment.

In the first embodiment, as shown in FIG. 17, part information B0 included in the training image TR0 may be input to the discriminator 32. In the second embodiment as well, the part information B0 included in the training image TR0 may be input to the discriminator 32. Here, the part information B0 is information indicating the part of the subject included in the training image TR0. The part information includes, for example, the head, chest, abdomen, legs, and the like. Here, WW and WL, which are a plurality of types of observation conditions, are set according to the part included in the training image TR0, that is, the CT image, as shown in FIG. 7. Therefore, by inputting the part information B0 to the discriminator 32, the discriminator 32 can be trained so as to output an appropriate discrimination result RF0 according to the part included in the image.

Next, a fourth embodiment of the present disclosure will be described. In the above-described first and second embodiments, one discriminator 32 is used to derive the discrimination result RF0 for the conversion training virtual image TVk and the conversion training image TRk according to the number of set observation conditions. The fourth embodiment differs from the first and second embodiments in that the generative model 30 is provided with the discriminator in a number corresponding to the number of set observation conditions.

Figure 18:
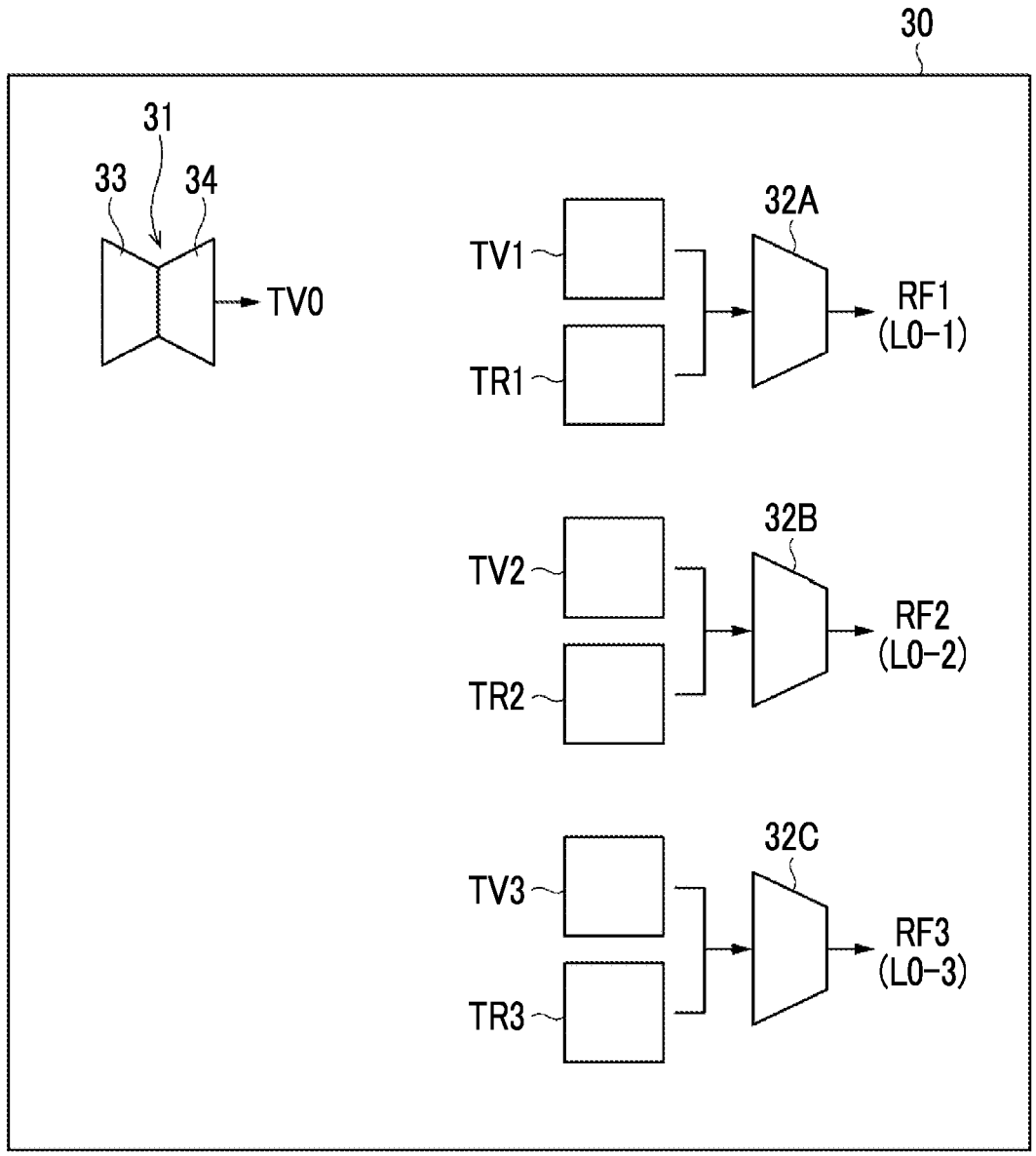
FIG. 18 is a conceptual diagram showing learning processing of a generative model in a fifth embodiment.

FIG. 18 is a conceptual diagram showing learning processing of a generative model in the fourth embodiment. Note that FIG. 18 shows only the generative model in FIG. 4. As shown in FIG. 18, the generative model 30 in the fourth embodiment comprises first to third discriminators 32A to 32C in a number corresponding to the number of set observation conditions (three in this case). The first discriminator 32A receives the conversion training virtual image TV1 and the conversion training image TR1 that have been subjected to the same scale conversion processing, and outputs a discrimination result RF1. The second discriminator 32B receives the conversion training virtual image TV2 and the conversion training image TR2 that have been subjected to the same scale conversion processing, and outputs a discrimination result RF2. The third discriminator 32C receives the conversion training virtual image TV3 and the conversion training image TR3 that have been subjected to the same scale conversion processing, and outputs a discrimination result RF3.

In the fourth embodiment, the learning unit 22 derives losses L0-1, L0-2, and L0-3 based on each of the discrimination results RF1 to RF3. Then, the learning unit 22 trains the generator 31 and the discriminator 32 by using each of the losses L0-1, L0-2, and L0-3. The learning unit 22 may train the generator 31 and the discriminator 32 by deriving the total sum of the losses L0-1, L0-2, and L0-3 and using the total sum of the losses L0-1, L0-2, and L0-3.

It goes without saying that the second embodiment may also be provided with a plurality of discriminators 32A to 32C as in the fourth embodiment.

In the first and second embodiments described above, the generative model 30 is trained using the first training image TL0 and the second training image TR0 having the same image content, but the present disclosure is not limited thereto. A first training image and a second training image having different image contents may be used.

In this case, the learning unit 22 may use, for example, the method of CycleGAN described in "Unpaired Image-to-Image Translation using Cycle-Consistent Adversarial Networks", Jun-Yan Zhu, arxiv: 1703.10593. In a case where the method of CycleGAN is applied to the present embodiment, in addition to the generator 31 that increases the resolution of an input image and the discriminator 32 that discriminates the genuineness of the input image that has been increased in resolution, the generative model 30 comprises another generator that reduces the resolution of the input image and another discriminator that discriminates the genuineness of the input image that has been reduced in resolution. For learning, any training images with different resolutions are prepared, and low-resolution images are input to the generator 31 to generate high-resolution virtual images. Also, the high-resolution image is input to another generator to generate a low-resolution virtual image. Then, the high-resolution image and the high-resolution virtual image are input to the discriminator 32 to output a discrimination result. Also, the low-resolution image and the low-resolution virtual image are input to another discriminator to output a discrimination result. Then, based on both discrimination results, a trained generative model 30 is constructed by learning a combination of the generator 31 and the discriminator 32 and a combination of another generator and another discriminator.

Further, in each of the above-described embodiments, the generator 31 performs the task of increasing the resolution of the input image to generate a virtual image, but the present disclosure is not limited thereto. For example, the generator 31 may perform a task of emphasizing or attenuating specific signal components of the input image, as described in "Review of Convolutional Neural Networks for Inverse Problems in Imaging", Michael T. McCann et al., arXiv: 1710.04011v1 [eess.IV] 11 Oct. 2017. In this case, the difference between the first feature and the second feature is the difference in strength of a specific signal component included in the image.

The generator 31 may also perform a task of removing noise such as artifacts included in the input image, as described in "Sharpness-aware Low dose CT denoising using conditional generative adversarial network", XinYi et al., arXiv: 1708.06453, 22 Aug. 2017. In this case, the first feature is that noise such as artifacts is included, and the second feature is that noise is not included.

The generator 31 may also perform a task of suppressing specific structures included in the input image, as described in "Learning Bone Suppression from Dual Energy Chest X-rays using Adversarial Networks", Dong Yul Oh et al., arXiv: 1811.02628, 5 Nov. 2018. In this case, the first feature is that the specific structure is included, and the second feature is that the specific structure is suppressed.

The generator 31 may also perform a task of embedding pseudo lesions in the input image, as described in "Synthesizing Diverse Lung Nodules Wherever Massively: 3D Multi-Conditional GAN-based CT Image Augmentation for Object Detection", Changhee Han et al., arXiv: 1906.04962, 12 Jun. 2019. In this case, the first feature is the absence of lesions, and the second feature is the presence of lesions. Therefore, the difference between the first feature and the second feature is a difference of the presence or absence of a lesion.

Furthermore, the generator 31 may also perform a task of converting the expression format of the input image into a different expression format, as described in "Deep MR to CT Synthesis using Unpaired Data", Jelmer M. Wolterink et al., Simulation and Synthesis in Medical Imaging pp 14-23, 26 Sep. 2017. Such tasks include, for example, a task of converting an MRI image expression format into a CT image expression format. In this case, the difference between the first feature and the second feature is the difference in expression format.

Further, in each of the above-described embodiments, the image input to the generator 31 is a CT image, but the present disclosure is not limited thereto. In addition to three-dimensional images such as an MRI image and a PET image, an ultrasound image and a radiation image acquired by simple radiography can be used as input images. In this case, an observation condition corresponding to the modality of the input image is prepared, and the training image is subjected to scale conversion processing and is used for training of the generator 31 and the discriminator 32. Thereby, the learning unit 22 trains the generator 31 and the discriminator 32 so as to adapt to the modality of the input image.

Further, in each of the above-described embodiments, a medical image is used as an image input to the generator 31, but the present disclosure is not limited thereto. For example, it is possible to use a photographic image as the input image. In this case, a plurality of types of observation conditions corresponding to the desired density and contrast of the input photographic image are prepared, and the training image is subjected to scale conversion processing and is used for training of the generator 31 and the discriminator 32.

Further, in each of the above-described embodiments, the image input to the generator 31 is normalized, but the present disclosure is not limited thereto. The input image may be input to the generator 31 without being normalized. In this case, the target image G0 can be input to the trained generative model 30 without being normalized.

Figure 19:
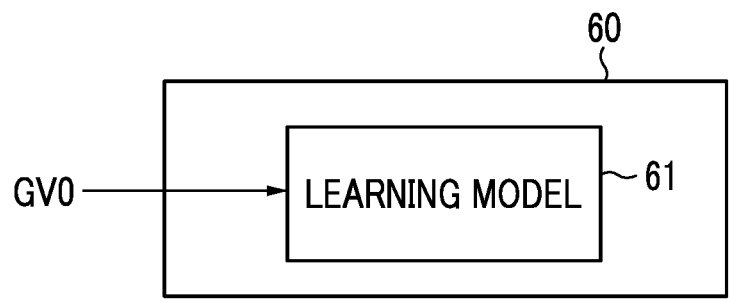
FIG. 19 is a diagram showing another learning apparatus according to the present embodiment.

Further, in each of the above-described embodiments, the virtual image derived from the input image may be transmitted to the image storage server 3 and saved. Alternatively, the virtual image may be recorded on a recording medium such as a CD-ROM, a DVD, a USB memory, or the like on which the virtual image is recorded. Note that the virtual images recorded in this way can be used for machine learning of a learning model that executes a task different from that of the generative model 30 of the present embodiment. For example, as shown in a learning apparatus 60 according to another embodiment shown in FIG. 19, a virtual image GV0 generated according to the present embodiment may be used as supervised training data for training a learning model 61.

Such a learning model 61 is, for example, a learning model for executing a task of estimating the position of a lesion included in a medical image. In a case of training such a learning model 61, it may not be possible to prepare a sufficient number of high-resolution supervised training data. In such a case, by using the virtual image derived by the generative model 30 according to the present embodiment as supervised training data, the lack of supervised training data can be resolved, and the robustness of the learning model 61 can be improved.

The learning model 61 also includes a learning model for executing a task of specifying a region of a structure such as an organ included in a CT image. In a case of training such a learning model 61, a correct label for specifying a region of a structure such as an organ included in a CT image is required as supervised training data. However, there are cases where a sufficient number of supervised training data for CT images cannot be prepared. In such a case, in a case where the generative model 30 that executes a task of converting the expression format of an input image from MM to CT is constructed by the learning apparatus of each of the above-described embodiments, from an MM image having correct labels for regions of structures such as organs, the generative model 30 can derive virtual CT images having correct labels for regions of structures. Therefore, even in such a case, the lack of supervised training data can be resolved, and the robustness of the learning model 61 can be improved.

Further, in each of the above-described embodiments, for example, as hardware structures of processing units that execute various kinds of processing, such as the information acquisition unit 21, the learning unit 22, the derivation unit 23, the generation unit 24, and the display control unit 25, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (programs).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example in which a plurality of processing units are configured by one processor, first, there is a form in which one processor is configured by a combination of one or more CPUs and software as typified by a computer, such as a client or a server, and this processor functions as a plurality of processing units. Second, there is a form in which a processor for realizing the function of the entire system including a plurality of processing units via one integrated circuit (IC) chip as typified by a system on chip (SoC) or the like is used. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. A learning apparatus that trains a generative model for generating a virtual image having a second feature different from a first feature from an input image having the first feature, the learning apparatus comprising at least one processor,
   wherein the processor is configured to:
   acquire a first training image having the first feature and a second training image having the second feature;
   generate a training virtual image having the second feature by inputting the first training image having the first feature to a generator, which is the generative model;
   derive a plurality of types of conversion training images with different observation conditions by performing a plurality of types of observation condition conversion processing on the second training image;
   derive a plurality of types of conversion training virtual images with the different observation conditions by performing the plurality of types of observation condition conversion processing on the training virtual image, wherein the different observation conditions include multiple window levels that are different or multiple window widths that are different as the different observation conditions, a window level is associated with a center of the input image to be observed and a window width is associated with an upper range and a lower range of the input image to be observed; and
   train the generative model using evaluation results regarding the plurality of types of conversion training images and the plurality of types of conversion training virtual images.

2. The learning apparatus according to claim 1,
   wherein the generative model includes a discriminator that outputs a discrimination result as to whether each of the plurality of types of conversion training images and the plurality of types of conversion training virtual images is a real image or a virtual image generated by the generator, and
   the processor is configured to train the generative model using the discrimination result from the discriminator as the evaluation result.

3. The learning apparatus according to claim 1,
   wherein the generative model includes a discriminator that outputs a discrimination result as to whether each of the plurality of types of conversion training images and the plurality of types of conversion training virtual images is a real image or a virtual image generated by the generator, and
   the processor is configured to:
   derive a difference between the conversion training image and the conversion training virtual image that have been subjected to the same type of observation condition processing; and
   train the generative model using the discrimination result from the discriminator and the difference as the evaluation result.

4. The learning apparatus according to claim 2,
   wherein in a case where the training image is a medical image,
   the processor is configured to further input part information indicating a part of a subject included in the training image to the discriminator, and
   the discriminator outputs the discrimination result reflecting the part information.

5. The learning apparatus according to claim 1,
   wherein the processor is configured to:
   derive a difference between the conversion training image and the conversion training virtual image that have been subjected to the same type of observation condition processing; and
   train the generative model using the difference as the evaluation result.

6. The learning apparatus according to claim 1,
   wherein the processor is configured to:
   normalize the first training image;
   generate a normalized training virtual image by inputting the normalized first training image to the generator;
   derive the plurality of types of conversion training images by performing a plurality of types of scale conversion processing on the second training image as the plurality of types of observation condition conversion processing; and
   inversely normalize the training virtual image to derive the plurality of types of conversion training virtual images by performing the plurality of types of scale conversion processing on the inverse-normalized training virtual image.

7. The learning apparatus according to claim 1,
   wherein the first training image and the second training image have the same image content.

8. A generative model trained by the learning apparatus according to claim 1.

9. An image generation apparatus comprising:
   at least one processor; and
   the generative model according to claim 8,
   wherein the processor is configured to generate a virtual image having a second feature by inputting an image having a first feature to the generative model.

10. A virtual image generated by the image generation apparatus according to claim 9.

11. A recording medium on which the virtual image according to claim 10 is recorded.

12. A learning apparatus comprising at least one processor,
wherein the processor is configured to:
acquire a virtual image generated by the image generation apparatus according to claim 9; and
construct a trained model by performing machine learning using the virtual image as supervised training data.

13. A learning method of training a generative model for generating a virtual image having a second feature different from a first feature from an input image having the first feature, the learning method comprising:
acquiring a first training image having the first feature and a second training image having the second feature;
generating a training virtual image having the second feature by inputting the first training image having the first feature to a generator, which is the generative model;
deriving a plurality of types of conversion training images with different observation conditions by performing a plurality of types of observation condition conversion processing on the second training image;
deriving a plurality of types of conversion training virtual images with the different observation conditions by performing the plurality of types of observation condition conversion processing on the training virtual image, wherein the different observation conditions include multiple window levels that are different or multiple window widths that are different as the different observation conditions, a window level is associated with a center of the input image to be observed and a window width is associated with an upper range and a lower range of the input image to be observed; and
training the generative model using evaluation results regarding the plurality of types of conversion training images and the plurality of types of conversion training virtual images.

14. An image generation method comprising generating a virtual image having a second feature by inputting an image having a first feature to the generative model according to claim 8.

15. A learning method comprising:
acquiring a virtual image generated by the image generation apparatus according to claim 9; and
constructing a trained model by performing machine learning using the virtual image as supervised training data.

16. A non-transitory computer-readable storage medium that stores a learning program causing a computer to execute a learning method of training a generative model for generating a virtual image having a second feature different from a first feature from an input image having the first feature, the learning program causing the computer to execute:
a procedure of acquiring a first training image having the first feature and a second training image having the second feature;
a procedure of generating a training virtual image having the second feature by inputting the first training image having the first feature to a generator, which is the generative model;
a procedure of deriving a plurality of types of conversion training images with different observation conditions by performing a plurality of types of observation condition conversion processing on the second training image;
a procedure of deriving a plurality of types of conversion training virtual images with the different observation conditions by performing the plurality of types of observation condition conversion processing on the training virtual image, wherein the different observation conditions include multiple window levels that are different or multiple window widths that are different as the different observation conditions, a window level is associated with a center of the input image to be observed and a window width is associated with an upper range and a lower range of the input image to be observed; and
a procedure of training the generative model using evaluation results regarding the plurality of types of conversion training images and the plurality of types of conversion training virtual images.

17. A non-transitory computer-readable storage medium that stores an image generation program causing a computer to execute a procedure of generating a virtual image having a second feature by inputting an image having a first feature to the generative model according to claim 8.

18. A non-transitory computer-readable storage medium that stores a learning program causing a computer to execute:
a procedure of acquiring a virtual image generated by the image generation apparatus according to claim 9; and
a procedure of constructing a trained model by performing machine learning using the virtual image as supervised training data.

* * * * *